(12) United States Patent
Ricart et al.

(10) Patent No.: US 12,211,245 B2
(45) Date of Patent: Jan. 28, 2025

(54) BATCH PROCESSING FOR POST-PRODUCTION STAGE OF MOVING IMAGES

(71) Applicant: BATCH STUDIOS INC., New York, NY (US)

(72) Inventors: Seth Ricart, New York, NY (US); Zachary Mulligan, Albany, NY (US)

(73) Assignee: BATCH STUDIOS INC., New York, NY (US)

( * ) Notice: Subject to any disclaimer, the term of this patent is extended or adjusted under 35 U.S.C. 154(b) by 0 days.

(21) Appl. No.: 18/583,222

(22) Filed: Feb. 21, 2024

(65) Prior Publication Data
US 2024/0371125 A1    Nov. 7, 2024

Related U.S. Application Data

(60) Provisional application No. 63/499,576, filed on May 2, 2023.

(51) Int. Cl.
| | | |
|---|---|---|
| G06K 9/00 | (2022.01) |
| G06V 10/70 | (2022.01) |
| H04N 5/265 | (2006.01) |
| H04N 5/272 | (2006.01) |

(52) U.S. Cl.
CPC ............ *G06V 10/70* (2022.01); *H04N 5/265* (2013.01); *H04N 5/272* (2013.01)

(58) Field of Classification Search
CPC ........ G06V 10/70; G06V 10/20; G06V 10/60; H04N 5/265; H04N 5/272; H04N 5/262; H04N 5/2723; H04N 5/2726; G06T 2207/20212; G06T 2207/02; G06T 2207/20221; G06T 2207/20081; G06F 16/58; G06F 16/583; G06F 16/5866; G06F 16/70

See application file for complete search history.

(56) References Cited

U.S. PATENT DOCUMENTS

| | | |
|---|---|---|
| 6,205,231 B1 | 3/2001 | Isadore-Barreca et al. |
| 8,213,689 B2 | 7/2012 | Yagnik et al. |
| 8,385,684 B2 | 2/2013 | Sandrew et al. |
| 10,430,662 B2 | 10/2019 | Katz et al. |
| 10,740,925 B2 | 8/2020 | Gupta et al. |
| 11,068,721 B2 | 7/2021 | Pan et al. |

(Continued)

FOREIGN PATENT DOCUMENTS

| | | |
|---|---|---|
| CN | 102388391 A | 3/2012 |
| WO | 2024121331 A1 | 6/2024 |

OTHER PUBLICATIONS

Kim et al. ("Deep Video Portraits", ACM Trans. Graph., vol. 37, No. 4, Article 163, pp. 163:1-163:14. Publication date: Aug. 2018) (Year: 2018).*

(Continued)

*Primary Examiner* — Duy M Dang
(74) *Attorney, Agent, or Firm* — Merchant & Gould P.C.

(57) ABSTRACT

Batch processing footage to perform one or more post-production tasks in the field of moving images. Footage is processed and tagged with metadata. The metadata is used to identify the same digital elements across different portions of the footage, enabling post-production tasks to be performed across the different portions simultaneously.

26 Claims, 17 Drawing Sheets

(56) References Cited

U.S. PATENT DOCUMENTS

| | | |
|---|---|---|
| 11,398,255 B1 * | 7/2022 | Mann .................. G06T 5/70 |
| 11,562,597 B1 | 1/2023 | Kim |
| 11,715,495 B2 | 8/2023 | Mann et al. |
| 11,830,159 B1 | 11/2023 | Mann et al. |
| 2010/0027961 A1 * | 2/2010 | Gentile ............... G11B 27/322 |
| | | 348/584 |
| 2019/0236371 A1 | 8/2019 | Boonmee et al. |
| 2019/0258671 A1 | 8/2019 | Bou et al. |
| 2021/0409836 A1 | 12/2021 | Russell et al. |
| 2023/0015971 A1 | 1/2023 | Mann et al. |
| 2023/0274549 A1 | 8/2023 | Hajash et al. |
| 2024/0193835 A1 | 6/2024 | Mann et al. |

OTHER PUBLICATIONS

International Search Report and Written Opinion from corresponding PCT Appln No. PCT/US2024/027257, dated Sep. 26, 2024 (15 pages).

* cited by examiner

BATCH PROCESSING FOR POST-PRODUCTION STAGE OF MOVING IMAGES

CROSS-REFERENCE TO RELATED APPLICATION

This patent application claims the benefit and priority to U.S. Provisional Application No. 63/499,576 filed May 2, 2023, the content of which is incorporated herein by reference in its entirety.

FIELD OF DISCLOSURE

The present disclosure is directed to processing of film and other moving images.

BACKGROUND

Filmmaking requires capturing a large amount of footage. The captured footage can total hundreds of hours of digital footage. Once captured, a post-production team is tasked with editing all of the digital footage to create the approximately 90-minute films that are seen in theaters or streamed on media streaming devices. The editing of the digital footage can take thousands of hours distributed across many post-production teams, with each team painstakingly having to go through individual frames of the captured footage and make changes to generate the finished product. Similar post-production burdens arise in making of other media content involving moving image sequences, such as animation.

As a result, the post-production process can significantly extend the production time of a movie or other moving image sequence. Moreover, in some cases post-production, or certain aspects of post-production, cannot begin until filming is complete or until the entire set of visual digital content from which a digital image sequence is extracted is generated or otherwise obtained. A given post-production team may require the full set of raw digital image content for analysis before post-production modifications to the content are made. Thus, the delay in beginning the post-production process further extends the total time to complete a film or other media content.

A matte generating team is one of many examples of post-production teams. Mattes are image masks used to combine image elements into a single, final image. For example, mattes may be used to combine a foreground image matte in which the background is masked with a background image matte in which the foreground is masked to create a new final image with foreground and background from different scenes or locations. For instance, footage may be taken of actors on a movie set at a studio. Mattes can be used to generate modified footage in which it appears as though the actors are in outer space or at a beach.

Typically, mattes are generated by filming actors in front of a solid color screen (e.g., a green screen or a blue screen). The color of the screen is isolated and removed from the footage and replaced with a different background frame by frame. The results are often poor, with the placement of the foreground actors within the new background appearing fabricated and unrealistic. Another technique relating to mattes is rotoscoping, which is a manual process in which a person traces an object in footage creating a silhouette (i.e., a matte) that can be used to extract that object from a scene for use on a different background.

SUMMARY

Aspects of the present disclosure relate to improvements in the post-production stage of making moving image sequences, such as a film.

Aspects of the present disclosure relate to automated batch processing of digital footage for making moving image sequences, such as a film.

Aspects of the preset disclosure relate to improvements in metadata generation for film and other moving image sequences.

Aspects of the preset disclosure relate to audio processing and tagging.

Aspects of the present disclosure relate to improvements in matte generation for film and other moving image sequences.

Aspects of the present disclosure relate to automated matte generation using a machine learning model.

Aspects of the present disclosure relate to matte generation that can be performed on a rolling basis as footage is obtained.

Aspects of the present disclosure relate to matte generation that does not involve rotoscoping or filming in front of a solid color screen, such as a green screen or a blue screen.

Aspects of the present disclosure relate to storing an automatically generated matte as a channel in a multi-channel image file.

Aspects of the present disclosure can be implemented as systems, and/or computer-implemented methods, and/or as instructions stored on non-transitory computer readable storage.

According to certain specific aspects, the present disclosure relates to a method for performing one or more tasks in a post-production stage of making a film, including: defining, by a first computing device, a type of digital element to provide a defined type; capturing, by a camera, first digital footage; transmitting, while the camera is performing the capturing, the first digital footage to a machine learning model, the first digital footage including a plurality of first digital image frames, wherein the machine learning model is configured, during the transmitting, to process the plurality of first digital image frames simultaneously to simultaneously identify digital elements associated with each of at least two of the plurality of first digital image frames, each of the digital elements having the defined type; transmitting first signals from the first computing device to a second computing device, the first signals causing a post-production task to be performed based on the digital elements.

According to additional aspects, the present disclosure relates to a system for performing one or more tasks in a post-production stage of making a film, comprising: one or more processors; and non-transitory computer readable storage storing instructions which, when executed by the one or more processors, cause the system to: receive, from a first computing device, a type of digital element corresponding to a defined type; receive first digital footage transmitted by a camera while the camera is capturing first digital footage, the first digital footage including a plurality of first digital image frames; process simultaneously, by a machine learning model, the plurality of first digital image frames to simultaneously identify digital elements associated with each of at least two of the plurality of first digital image frames, each of the digital elements having the defined type; generate, by the machine learning model, metadata for each of the at least two of the plurality of first digital image frames, the metadata tagging each of the at least two of the plurality of first digital image frames based on the defined type; receive, from the first computing device, first signals, the first signals causing a post-production task to be performed based on the metadata.

According to additional aspects, the present disclosure relates to a computer-implemented method for processing video footage, including: using a machine learning model to: receive first footage; receive a tag identifying an object in the first footage; process the first footage, including to identify, based on the tag, one or more instances of the object in the first footage; and generate, based on the one or more instances, a matte corresponding to the object.

According to further specific aspects, the present disclosure relates to a system for processing video footage, including: one or more processors; and non-transitory computer readable storage storing instructions which, when executed by the one or more processors, cause the one or more processors to provide, to a machine learning model, first footage; provide, to the machine learning model, a tag identifying an object in the first footage such that the machine learning model: processes the first footage, including identifying, based on the tag, one or more instances of the object in the first footage; and generates, based on the one or more instances, a matte corresponding to the object; and receive the matte generated by the machine learning model.

According to further specific aspects, a computer-implemented method for processing footage, includes: receiving, by a machine learning model, first signals generated by a computing device, the first signals providing first footage; receiving, by the machine learning model, second signals generated by the computing device, the second signals providing a tag, the tag identifying an object in the first footage; processing, by the machine learning model, the first signals and the second signals, including identifying, by the machine learning model and based on the second signals, one or more instances of the object in the first footage; and generating, with the computing device or with another computing device, and based on the one or more instances, a matte corresponding to the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures, wherein like numbers correspond to like parts, components, or features.

DETAILED DESCRIPTION

Figure 1:
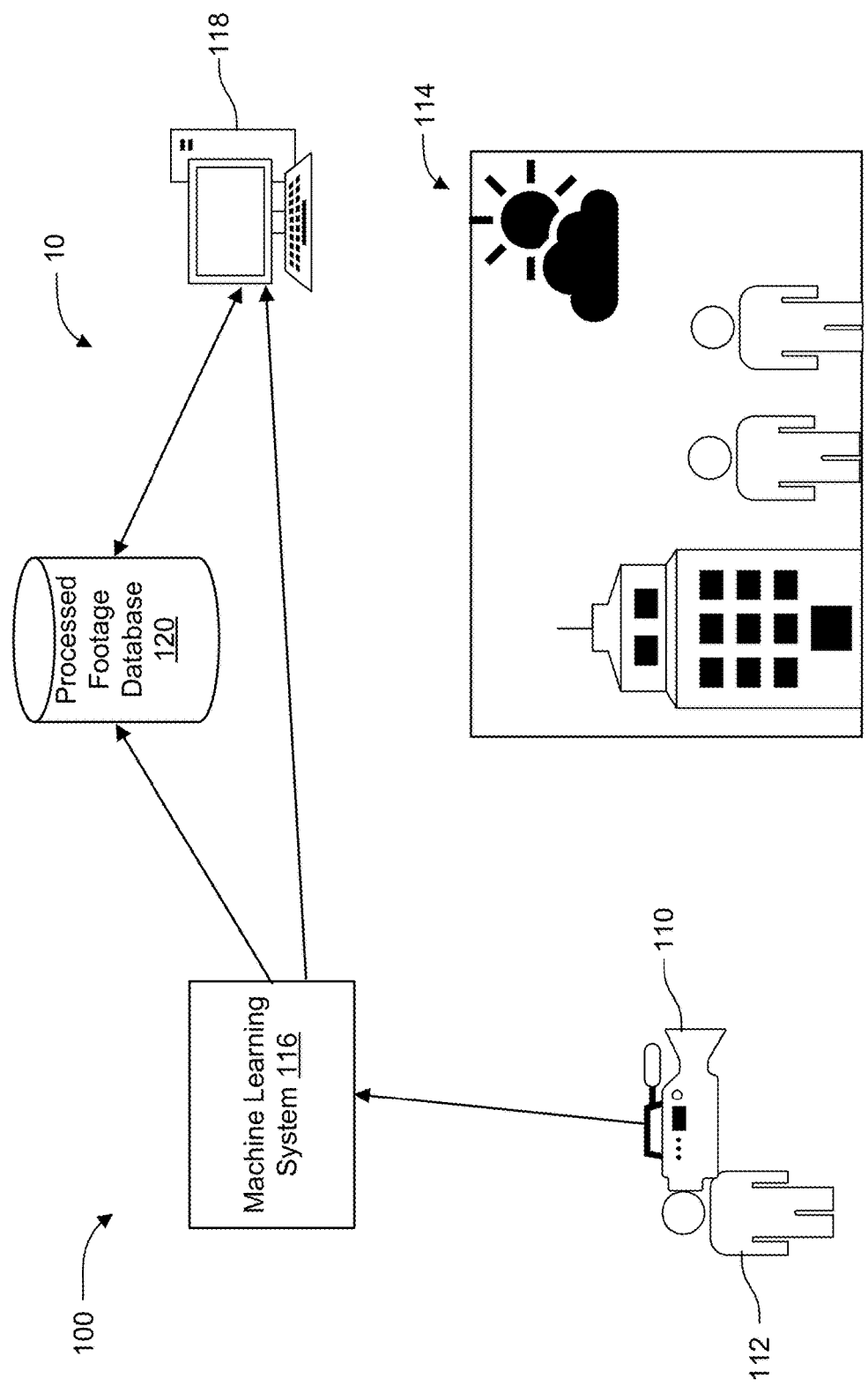
FIG. 1 schematically depicts an example environment of a batch processing system for the post-production stage of a film.

Filmmaking requires an extensive amount of post-production before it is ready for viewing by a general audience. Film production typically takes place over several days, weeks or months of shooting different scenes with a camera. Once shooting is complete, post-production can commence. These general principles are common both for making feature films (e.g., of approximately 90 minutes or more in length) and well as other types of video content such as episodic shows or shorts that appear on television or are available by a media streaming platform. These general principles also apply to making other types of moving image sequences, such as animation.

As used herein, the term "image sequence" or the term "footage" is a sequence of digital images that can be played back by a media playback device to display a moving image generated by the sequence. An image sequence or footage can be in 2D or 3D. Thus, for example, an image sequence or footage can refer to a sequence of images and associated audio, taken with a visual digital camera and/or or one or more audio detection devices, and/or to an animation (e.g., an animated image or sequence of images).

As used herein, the term "frame" refers to a still image or single image of footage or a sequence of images.

As used herein, the term "raw footage" refers to footage upon which at least one post-production task is yet to be performed.

The images or frames of footage or the images of a moving image sequence can be generated in a variety of different ways. Non-limiting examples include visual images captured by a camera, visual images generated by a computing device, such as animation images, non-digital images that are scanned, digitalized, and or otherwise processed (e.g., using artificial intelligence such as a neural network and/or machine learning model) to generate digital visual images, and the like. The images or frames of footage can be generated or captured together or, alternatively, separately and stored in a repository of still digital images from which footage is generated.

Post-production includes a number of tasks. For example, a post-production team may need to add in visual effects (e.g., animation) to the captured footage, or change the background for a given scene. Another post-production team may be responsible for sound quality or adding sound effects. Other post-production teams may be responsible for post-productions task such as editing contrast and color, audio shot matching, adjusting sound levels, removing from the footage images of production objects that do not belong, such as microphone booms or cameras, and many more such tasks. Each task can demand numerous hours of labor as the raw footage typically requires modifications to be made frame by frame and/or determining which frames of many hundreds of thousands or millions of frames are relevant to each task.

The present disclosure relates to using a machine learning model for batch processing of digital footage for post-production tasks involved in making moving images. One example includes using the model to batch tag multiple frames of the digital footage with various metadata that can be used to perform various post-production tasks that modify the footage. For instance, batch processing can include using a model to automate tracking, masking and labeling people, faces, skies, and other objects, as well as object attributes, in motion picture video, such as film.

Aspects of the present disclosure can advantageously significantly decrease the time required for the post-production of making a moving image such as an animation or a film, whether the animation or film is a full length feature film, an episodic show, a shorter feature, a video, a commercial, and the like. For example, tagging frames of the raw digital footage with metadata specific to a post-production task allows the system to modify, simultaneously, all frames that have been tagged with the relevant metadata. The system can process all captured digital footage in real time, and tag the frames of the digital footage with relevant metadata. The metadata is generated based on different types of digital elements that are relevant to one or more post-production tasks.

The batch processing system learns how to automatically identify each digital element of a given type in footage frames. Different digital element types are relevant to different post-production tasks. For example, a digital element type is an image of an unwanted microphone boom in a shot. A post-production task associated such a digital element type is removing the unwanted microphone from the shot.

Another example of a digital element type is a particular background. A post-production task associated with such a digital element type is generating a matte corresponding to the background. Another example post-production task associated with such a digital element type is replacing the background in the digital footage with another background.

Another example of a digital element type is a visual image of an object in digital footage. An object can be, for example, a specific person (such as a character in a movie), a face, an animal, a vehicle, a background object, a foreground object, and the like. Examples of post-production tasks associated with a such a digital element include to remove the object, to enlarge the object, to shrink the object, move the object further into the background or foreground, to adjust color of the object, to identify a sound generated by the object, to generate a matte of the object, and so forth.

Another example of a digital element type is the z depth of the object and scene. An example of a post-production task associated with such a digital element is to generate a multi-channel image file for mattes. One such matte can be the depth matte, which illustrates the location of an object in z depth within a scene. A channel for the entire scene can be created, as well as channels for the specific objects within the scene.

Another example of a digital element type is a clip of audio dialogue. A post-production task associated with such a digital element type is identifying dialogue missing from the clip based on a film script.

Another example of a digital element type is a scene from digital footage. A post-production task associated with such a digital element type is cutting the scene from the digital footage. Another post-production task associated with such a digital element type is splicing the scene from the digital footage.

Another example of a digital element type is a first shot and a second shot of a scene, e.g., taken by different cameras. A post-production task associated with such digital element type is matching the raw footage of the first shot with the raw footage of the second shot. Another post-production task associated with such a digital element type is combining the first shot from the first digital footage with the second shot from the second digital footage.

Another example of a digital element type is audio noise. A post-production task associated with such a digital element type is removing the audio noise.

Another example of a digital element type is an audio signal. A post-production task associated such digital element type is syncing audio signals to the raw digital footage. Another post-production task associated such a digital element type is adjusting an audio quality of the audio.

Another example of a digital element type is any defined type of digital element. In some examples, a defined type can be a digital image of an object, a digital visual effect generated by the camera, an audio signal corresponding to a sound output generated by the object, or a digital audio effect. A post-production task associated with such digital element type is playing back a scene from additional digital footage having a digital element of the defined type.

A computing device performing a given post-production task, such as the example tasks described above, can pull all raw footage frames that have been tagged with metadata corresponding to a given digital element type. For instance, for a removal task, a computing device pulls all footage frames tagged with metadata indicating the presence of an image of a microphone boom. The computing device performing the particular post-production task can then perform the removal task, e.g., by removing all the instances of a microphone boom from the tagged frames.

In another example, for a replacement task, a computing device pulls all raw footage frames tagged with metadata indicating a particular type of background that is to be replaced. The computing device performing the particular post-production task can then perform the replacement task, e.g., by replacing the background in all tagged frames of raw footage.

In another example, for a sound effect task, a computing device pulls all raw footage frames tagged with metadata indicating a sound effect that is to be added. The computing device can then perform the sound effect task, e.g., by adding a sound effect to all tagged frames.

In another example, for an object correct task, a computing device pulls all raw footage frames tagged with metadata indicating an object to be corrected, such as an actor having appearance adjustments. The computing device performing the particular post-production task can then perform the object adjustment task, e.g., by correcting the object, such as modifying its appearance.

In certain embodiments, the batch processing system learns as it receives more footage in real time. That is, as the data set increases with more footage for given film going through production, the batch processing system improves over time at identifying digital elements of specific types in the footage. In some examples, the batch processing system identifies additional digital elements in previously processed footage frames and tags previously processed footage frames as it processes and learns from new footage. Similarly, the batch processing system, as it processes and learns from new footage, can determine that previously tagged frames were tagged erroneously.

For example, the batch processing system learns over time as it is fed more and more footage how to correctly identify and tag with the appropriate metadata a particular data element type in frames of raw footage, such as microphone boom that does not belong. The batch processing system can reprocess previously processed raw footage to add metadata tags to footage frames that were not previously tagged but should have been for the presence of a microphone boom, or remove metadata tags from other previously tagged frames that the batch processing system has since learned did not in fact include a microphone boom.

Typically, video footage is paired with correspond audio captured by one or more microphones during a film shoot. The batch processing system can batch process the audio associated with multiple frames of video footage and generate and apply metadata tags to the relevant video frames and/or the corresponding audio clips based on audio-type digital elements.

An example audio-type digital element is the voice of a particular character or actor. The batch processing system is configured to analyze voices across a portion or all of the digital footage. Analyzing voices may include cataloging sounds and searching throughout the audio that is paired with the video footage, tagging footage frames with associated dialogue event metadata, and identifying information for protocols and other mixing software.

The batch processing system can use audio and visual analysis to improve its reliability in identifying digital elements. For instance, the batch processing system may use voice recognition to increase the confidence of how it applies metadata tags corresponding to visual images of actors. For example, the batch processing system can have greater confidence that an image of a person in certain frames of the footage is a particular character based on the associated audio including digital elements known by the batch processing system to correspond to that character's voice. Audio processed by the machine learning model(s) of the batch processing system can be cross-referenced with facial recognition imaging to better label individuals or other sound producing objects for purposes of metadata tagging. The sound analysis can also be used as audio search criteria for searching and organizing clips of the footage, e.g., during the editing process.

Other aspects of the present disclosure have the capability to eliminate the need for green screens, while dramatically decreasing the number of person-hours required to perform traditional rotoscoping, which is a highly manual editing process that must be performed on a frame-by-frame basis.

Advantageously, aspects of the present disclosure allow for batch processing of many raw footage frames simultaneously to generate many metadata-tagged footage frames that can serve a variety of different post-production tasks.

Though specific examples described herein in reference to the drawings will refer to production and post-production operations of a motion picture or film in which the raw footage is captured using a camera, aspects of the present disclosure can be readily applied to post-production of any digital moving images, as further described herein.

As used herein, a film is a type of moving image. In addition, it should be appreciated that metadata tags generated by the batch processing system for one film or other moving image production may be used to generate corresponding metadata tags for another film or moving image, such as a sequel to the original film, or even a completely unrelated film that includes one or more of the same digital element types, such as the same actors, same animation, and the like. That is, the machine learning models described herein need not be trained anew for each new moving image production, at least with respect to certain digital element types, and instead use their understanding of how to identify those digital element types from other moving images to generate corresponding metadata tags for footage frames. For instance, for a current film that has started shooting starring actor John Smith, the machine learning model can pull footage of John Smith acting in prior films to learn how to identify John Smith for purposes of matte generation or another post-production task in the current production.

In certain embodiments, during a moving image production pipeline (such as for the production of a feature film), the video footage, which consists of a sequence of many image frames, is sent to a post-production facility each day. According to aspects of the present disclosure, the footage is, each day, automatically loaded and processed by the batch processing system. The batch processing system tags the frames with metadata and stores the tagged frames updating the tagged frames as more footage is received from subsequent shoots. Once the production stage is complete, advantageously the post-production analysis of footage has already been completed by the batch processing system in the form of the stored, metadata-tagged footage frames. The film then enters the post-production stage whereby various computing devices can access the tagged frames to perform various post-production tasks.

Because metadata tagging for post-production tasks are generated on a rolling basis before filming is complete, the need to process all of the footage at the end of shooting, which can take weeks, months, or longer and many person-hours to complete, is negated.

Typically, processing footage on the "fly", e.g., after each shoot, takes too long and is therefore not possible or not practical, such that the processing of all the footage is done only at the end of all shooting as its own post-production phase. However, aspects of the present disclosure can eliminate these inefficiencies in post-production, dramatically reducing the time from the end of shooting to a final product, while requiring many fewer person-hours in the process.

In addition, and as mentioned previously, the batch processing system includes one or more machine learning models that can learn from the footage as the data set grows, e.g., as more footage is taken during a filming shoot (or a growing set of footage for an animation, for example), thereby improving upon the model's own prior metadata tagging for a given production. For instance, for a character data element type, as more and more footage is supplied to the machine learning model, the model can learn how to positively identify a character in the film regardless of how close or how far away the character is in the image, regardless of the lighting, regardless of the physical orientation of the character within the footage (e.g., facing forward, facing backward, or facing another direction), regardless of the makeup and clothing the character is wearing, regardless of how the character's body may change during the film (e.g., becoming older, becoming younger, becoming heavier, becoming thinner), regardless of hair style or facial hair, etc. That is, advantageously the footage can be learned on a rolling basis over the course of a film to continually improve automatic post-production modification so that by the time, e.g., final color grading occurs, the entire film, e.g., all, or a large number of the frames taken throughout the film shoot and that have been preserved through the editing process, have also been processed with high accuracy.

From the large amount of data (e.g., raw footage frames, including many frames which will not ultimately make the final cut of the video and will never themselves be processed) that is input to the machine learning model(s) of the batch processing system, the model(s) can accurately learn how to identify specific digital element types such as specific objects, and also how to learn other features of the footage, such as depth of objects within the footage, allowing the model to better isolate visual aspects such as skies, foreground, and background, people, faces, and so forth, based on their depth level. For a person or other object tagged by the machine learning model(s) with frame metadata, for example, the metadata tag can include one more additional attributes, such as a depth attribute. Using the depth attribute allows for post-production tasks involving efficient layering of mattes (or for other post-production purposes) to generate modified footage with different digital elements positioned at the appropriate depth within the modified footage. Analyzing depth can also aid the machine learning model in identifying specific attributes in footage when cross referenced with the digital elements' image depth.

The machine learning model as employed herein can be constructed according to any machine learning model type suitable to generate the frame-metadata tagging outputs described herein.

For example, the machine learning model can include one or more neural networks. Neural networks typically consist of multiple layers, and the signal path traverses from front to back. The multiple layers perform a number of algorithms or transformations. In general, the number of layers is not significant and is use case dependent. For practical purposes, a suitable range of layers is from two layers to a few tens of layers. Modern neural network projects typically work with a few thousand to a few million neural units and millions of connections. The neural networks may have any suitable architecture and/or configuration. In some embodiments, the neural networks may be configured as a deep convolutional neural network (DCNN). The neural networks described herein belong to a class of computing commonly referred to as machine learning. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data-such algorithms overcome following strictly static program instructions by making data driven predictions or decisions, through building a model from sample inputs.

The neural networks described herein may also or alternatively belong to a class of computing commonly referred to as deep learning (DL). Generally speaking, "DL" (also known as deep structured learning, hierarchical learning or deep machine learning) is a branch of machine learning based on a set of algorithms that attempt to model high level abstractions in data. In a simple case, there may be two sets of neurons: ones that receive an input signal (e.g., an input signal corresponding to raw footage) and ones that send an output signal (e.g., a signal representing metadata that tags the raw footage). When the input layer receives an input, it passes on a modified version of the input to the next layer. In a base model, there are many layers (often called hidden layers) between the input and output, allowing the algorithm to use multiple processing layers, composed of multiple linear and non-linear transformations. DL is part of a broader family of machine learning methods based on learning representations of data.

According to some examples, the machine learning model is a recurrent neural network (RNN) model. A RNN model can be suited for the present purposes in that a RNN model is configured to take, as part of its input, its previous output, together with further inputs, to generate the next output. As will be described in greater detail herein, according to the present disclosure, the machine learning model is configured to provide, based on inputs of raw footage, metadata tagged footage. As time goes on, previously tagged raw footage generated by the machine learning model can be added to subsequently received raw footage inputs (e.g., footage taken from a different shooting day) to generate additional metadata-tagged frames or to refine or modify previous tagging. In some examples, the RNN model may be used in combination with one or more convolutional layers.

The systems of the present disclosure provide improvements in the technological areas of production and post-production of digital moving images. In some examples, such improvements are embodied in improved processing of certain signals transmitted between different electronic devices associated with the production and post-production stages of moving images.

For instance, a digital camera during film production (or another electronic device that generates, stores or captures still images that can be sequenced into to a moving image) generates signals that provide digital footage and, in some examples, associated audio signals, captured from a set or otherwise captured or generated, and transmits those signals, e.g., via a network, in real time to a batch processing system. The batch processing system receives the signals and, based thereon, generates metadata with which it tags relevant frames of the footage. The batch processing system generates additional signals that cause the metadata-tagged footage frames to be stored, e.g., in a database or other repository. Various computing devices associated with different post-production tasks generate and transmits different signals that cause the computing devices to retrieve different sets of footage frames, as defined by each computing device, of the metadata-tagged footage. Additional signals transmitted from the repository cause the retrieved metadata-tagged frames to be provided to the post-production computing devices that retrieved them. The post-production computing devices then perform post-production tasks on the retrieved metadata-tagged frames.

Further technology improvements provided by the batch processing system of the present disclosure include the ability to integrate the functionality of the batch processing system into multifarious computing devices and/or with various different post-production task platforms that perform different post-production tasks, such as the tasks described herein. For example, a software plugin can be made compatible with different post-production task platforms via an application program interfaces (API). The plugin pulls the task-specific metadata-tagged footage from the batch processing system's repository.

FIG. 1 schematically depicts an example environment 10 of a batch processing system 100 for the post-production stage of a film.

The environment 10 includes the batch processing system 100, a user 112, and a scene 114. The batch processing system 100 includes at least one camera 110, a machine learning system 116, a post-production device 118, and processed footage database (or other non-transitory repository) 120. Further, a user 112 uses the camera 110 to obtain digital footage of the scene 114.

In the example environment 10, only one camera 110 is shown. However, in other examples there may be two or more cameras, for example, taking different shots of the same scene 114, with each such camera generating raw film footage that is transmitted to the machine learning system 116.

As mentioned, the batch processing system 100 includes a camera 110. In some embodiments, the camera is a video camera that is configured to capture digital footage of a scene such as the scene 114. The camera 110 may include a microphone as shown. In some embodiments, the batch system obtains audio from the scene 114 with sound recorded independently of the camera.

The video camera 110 connects to the machine learning system 116. Raw digital footage is transmitted over this connection from the camera 110 to the machine learning system 116. In some embodiments, the raw digital footage is saved to a removable storage device and processed by the machine learning system 116 at a later time. In some embodiments, the camera 110 connects to the machine learning system 116 over a wireless connection or a wired connection. In some embodiments, the digital footage is fed in real time from the camera 110 to the machine learning system 116 and is processed by the machine learning system 116 actively as it is fed the footage, or in batches of footage in defined and/or predefined increments.

In some embodiments, the camera 110 captures the footage at a specified resolution. For example, the camera 110 may capture footage at 1080p, 4k, 8k, or other resolutions. While shown as with particular connections, the camera 110 may also directly connect (e.g., via a network) to the processed footage database 120 and post-production device 118.

In the shown embodiment, the batch processing system 100 also includes the machine learning system 116. The machine learning system 116 is configured to process received digital footage from the camera 110 by tagging frames of the footage with metadata corresponding to digital elements having digital element types. The processed footage is used to perform different post-production tasks by different post-production devices.

The post-production tasks may include at least one of generating a matte corresponding to the digital elements, determining image depths of the digital elements within the first digital footage, identifying missing dialogue based on a dialogue script, cutting a scene from the first digital footage, splicing scenes from the digital footage, playing back a scene from second digital footage having a digital element of the defined type, matching a first shot from the first digital footage with a second shot from the second digital footage, combining the first shot from the first digital footage with the second shot from the digital second footage, removing the digital elements from the first digital footage, replacing the digital elements in the first digital footage with other digital elements, removing audio noise, adding sound, syncing audio to the first digital footage, and/or adjusting an audio quality of the digital elements.

In some embodiments, defining of the digital element types occurs after the transmission of the first digital footage to the machine learning system 116. In some embodiments, the instructions cause the machine learning system 116 to generate metadata for each of the at least two of the plurality of first digital image frames, the metadata tagging each of the at least two of the plurality of first digital image frames based on the defined type.

In some embodiments, the machine learning system 116, during transmission of first digital footage, processes the plurality of first digital image frames simultaneously to simultaneously identify other digital elements associated with each of at least two others of the plurality of first digital image frames, each of the other digital elements having another defined type.

Processing the digital footage includes generating metadata for multiple frames simultaneously that tags those frames with information about the digital elements associated with them. In some embodiments, the metadata is a tag that identifies a certain aspect of a frame of the digital footage. For example, the tag may identify an actor/actress, an object, a scene, background, or another digital element of the frame.

In some embodiments, the machine learning system 116 tags non-visual data paired with the digital footage. For example, the recorded audio accompanying digital footage is tagged as audio of a certain actor/actress. Further, the machine learning system 116 may tag a frame of the digital footage with a certain actor/actress based on the detected audio matching that actor/actress.

In some embodiments, the machine learning system 116 generates a matte to layer with a frame of digital footage. For example, one matte may replace the background of the building in the scene 114 with a forest. In some embodiments, the machine learning system 116 tags dialogue-based detected audio from the digital footage.

The batch processing system 100 includes the post-production device 118. The post-production device 118 is configured to access the processed (e.g., metadata-tagged) raw footage and make modifications to the raw footage based on that metadata. The post-production device 118 may be configured to perform one or more of any of the post-production tasks described herein, and/or other post-production tasks.

For example, the post-production device 118 may access the processed footage tagged with metadata to indicate the frames contain an unwanted microphone boom, modify all such tagged frames, and process each such frame by removing the image of the microphone boom.

In some embodiments, the post-production device 118 modifies frames tagged with a first background and replaces it with a second background. For example, replacing the first background with the second background may include generating and applying one or more mattes based on the relevant tagged footage using the post-production device 118.

In some embodiments, the batch processing system 100 includes the processed footage database 120. The processed footage database stores footage that has been processed by the machine learning system 116. In some embodiments, the processed footage database stores frames that are tagged with relevant metadata. The processed footage can be stored in portions of the database 120 according to the metadata associated with the footage. That is, the database 120 can be structured to store processed footage organized according to the tagged digital elements it contains.

Similarly, the processed footage database 120 can store processed audio paired with the video footage.

In some embodiments, the processed footage database stores one or more mattes generated by the post-production device 118.

In some examples, the user 112 is a cameraman on a filmset operating the camera 112.

In some embodiments, the scene 114 includes a different background, such as a forest. In some embodiments, the scene 114 is digitally generated with a matte. In some embodiments, the matte can be changed using the machine learning system 116 and/or the post-production device 118.

As noted, the machine learning system 116 tags raw footage with metadata according to digital element types, and the post-production device 118 performs a post production task with the tagged footage. In this, manner the batch processing system 100 can perform numerous functions.

For example, the batch processing system 100 finds and removes boom mics across all digital footage. In some embodiments, the batch processing system 100 replaces all skies or replaces specific types of skies only. In some embodiments, the batch processing system 100 alters the appearance of people. For example, the batch system may perform eye bag adjustment, smooth skin adjustment, whiten teeth, or sharpen eyes for one or more actors/actresses. In some embodiments, altering the appearance of people includes utilizing one or more mattes. In some embodiments, the batch processing system 100 defoliates plants and or other greenery. In some embodiments, the batch processing system 100 performs rotoscoping to create a scene or frame. In some embodiments, the batch processing system 100 labels actors/actresses and objects in the digital footage. In some embodiments, the batch processing system 100 tags audio in the digital footage. In some embodiments, the batch processing system 100 categorizes scenes such as night, day, interior, exterior, location, etc. In some embodiments, the batch processing system 100 processes audio notes from the direction, script supervisor, or producer. In some embodiments, the batch processing system 100 recognizes who left the note based on voice recognition. In some embodiments, the batch processing system 100 balances the foreground and background by adjusting the color temperature or matching the contrast between shots of a scene. In some embodiments, balancing the foreground and background is completed independently and/or together. In some embodiments, the batch processing system 100 matches the audio with appropriate frames and scenes. In some embodiments, matching the audio includes matching levels and removing/adding background noise. In some embodiments, the batch processing system 100 reads slates using optical character recognition (OCR) and metadata. Other functions are possible.

In some embodiments, the post-production device 118 accesses the machine learning system 116 and uses metadata-tagged frames generated by the system 116 to perform a post-production task. For example, a post-production task may include generating a matte corresponding to a digital element. Moreover, some embodiments include second, third, fourth, or more post-production device that access the machine learning system 116 to use the machine learning model to perform various different post-production tasks.

Figure 2:
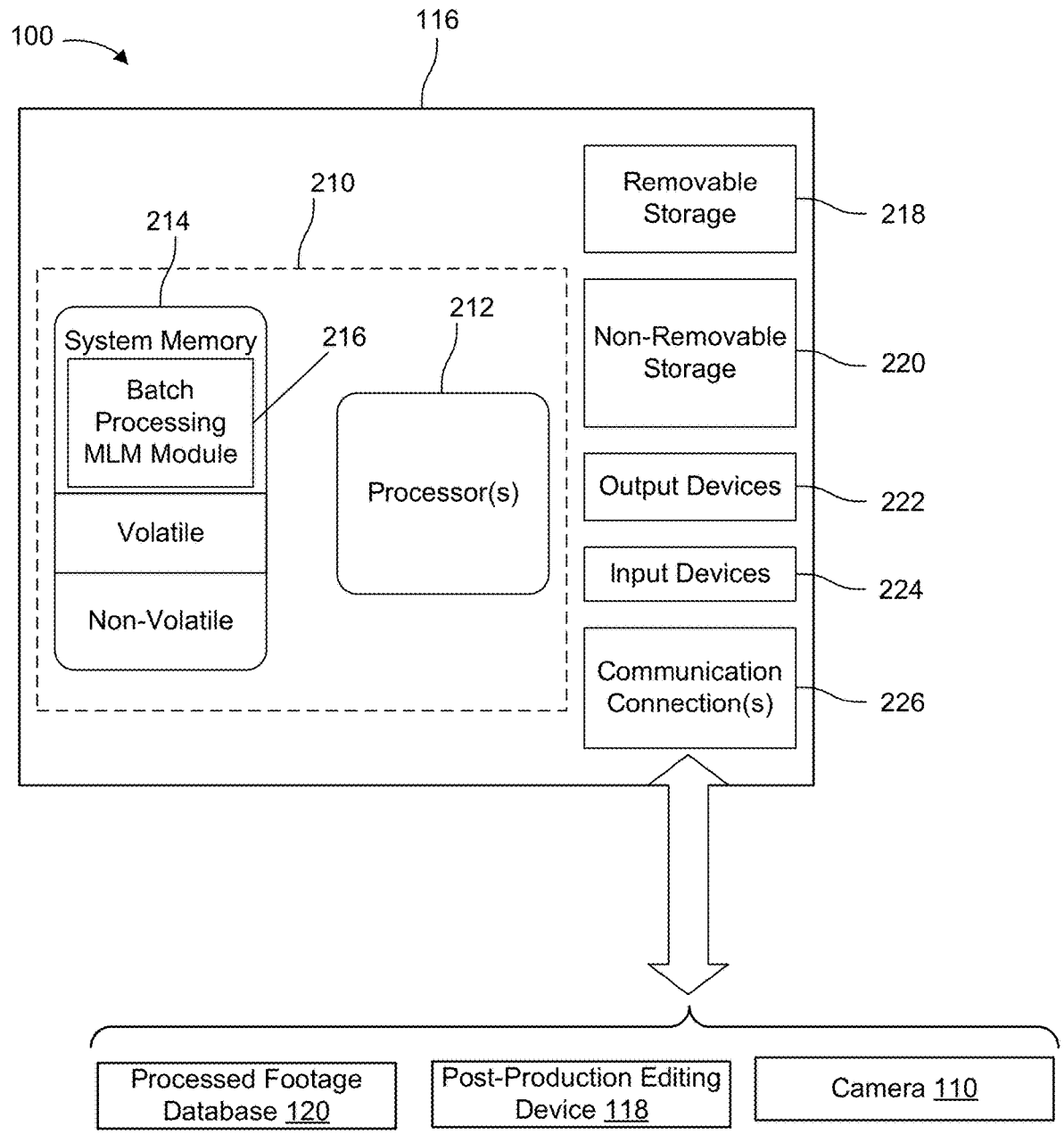
FIG. 2 depicts example components of the batch processing system of FIG. 1.

FIG. 2 depicts example components of the batch processing system 100 of FIG. 1. In the shown embodiment, the machine learning system 116 includes components 210, which include one or more processors 212 coupled to a system memory 214. The system memory 214 includes a batch processing machine learning model (MLM or ML model) module 216. The machine learning system 116 also includes one or more communication connections 226 which communicatively connects to the processed footage database 120, the post-production device 118, and the camera 110.

The one or more processors 212 couple to the system memory 214. The system memory 214 may include non-transitory computer readable media. In some embodiments, the system memory 214 (storing, among other things, a batch processing MLM module 216, which includes a machine learning model that can be trained to perform various post-production changes in accordance with the present disclosure) can be volatile (such as RAM), non-volatile (such as ROM, flash memory, etc.), or some combination of the two. The machine learning system 116 may include one or more graphics processing units (GPUs), application specific integrated circuit (ASIC), or other integrated circuit (IC) configured to expedite model training and/or model predictions. Further, the computing device 202 may also include storage devices (removable 218, and/or non-removable 220) including, but not limited to, solid-state devices, magnetic or optical disks, or tape. Further, the machine learning system 116 may also have input device(s) 224 such as touch screens, keyboard, mouse, pen, voice input, etc., and/or output device(s) 222 such as a display, speakers, printer, etc. One or more communication connection(s) 226, such as local-area network (LAN), wide-area network (WAN), point-to-point, Bluetooth, RF, etc., may also be incorporated into the computing device 202.

In some embodiments, the communication connection(s) 226 connect to the processed footage database 120, the post-production device 118, and/or the camera 110. In some embodiments, the communication connection(s) is/are a wired or wireless connection.

In some embodiments, the batch processing MLM module 216 includes instructions that cause the one or more processors to perform operations. In some embodiments, the instructions include receiving first digital footage from the camera 110. The module 216 can be trained manually and/or on its own to develop and refine one or more algorithms that identify different digital elements simultaneously in many frames of raw footage. The module 216 can select digital elements for identification by digital element type on its own, i.e., automatically. In some examples, the module 216 can be fed digital element types to identify, e.g., by signals generated by another computing device, such as the camera 110, the post-production device 118 or another device. One or more machine learning models of the module 216 can correspond to the machine learning models, including neural networks and the like, described above.

In some embodiments, the instructions cause the processor(s) 212 to process a plurality of first digital image frames simultaneously to simultaneously identify digital elements associated with each of at least two of the plurality of first digital image frames. In some embodiments, each of the digital elements have a defined type. In some embodiments, the defined type is defined by the post-production device 118. The instructions the processor(s) 212 to generate, for at least two of the plurality of the first digital image frames, metadata corresponding to the digital elements. In some embodiments, a post-production task is performed based on the metadata. In some embodiments, the defined type is one of a digital image of an object, a digital visual effect generated by the camera, an audio signal corresponding to a sound output generated by the object, and/or a digital audio effect.

In some embodiments, the defined type is a digital image of an object, and the object is one of an image foreground element, an image background element, a person, a vehicle, or an animal. In some embodiments, the defined type is a digital visual effect, and the digital visual effect is generated by a lens or a filter. In some embodiments, the object is a clapperboard.

As mentioned, in some embodiments, the batch processing MLM module 216 includes a MLM. The MLM may be configured to perform algorithms to generate tags, process audio, and generate mattes as described. Further, the MLM may be trained on past data or initially tagged data to improve performance. In some embodiments, the MLM is a deep learning model. In some embodiments, instructions of the batch processing MLM module 216 include instructions configured to execute the functions of the machine learning system 116 described herein.

In some embodiments, the defining of the digital element types occurs after the transmission of the first digital footage to the machine learning system 116. In some embodiments, the instructions of the batch processing ML model module 216 cause the processor(s) 212 to generate metadata for each of the at least two of the plurality of first digital image frames, the metadata tagging each of the at least two of the plurality of first digital image frames based on the defined type.

In some embodiments, the instructions of the machine learning system 116 cause the processor(s) 212, during transmission of first digital footage, to process the plurality of first digital image frames simultaneously to simultaneously identify other digital elements associated with each of at least two others of the plurality of first digital image frames, each of the other digital elements having another defined type. In some embodiments, the batch processing ML model module 216 receives signals from a second post-production device. In some embodiments, the received signals cause the machine learning system 116 to perform another post-production task, different from a first post-production task, based on one or more other digital element types. In some embodiments, the first signals from the post-production device 118 cause the post-production task to be performed simultaneously on the plurality of first digital image frames based on digital elements.

Components of the machine learning system 116 can be local to one another and/or distributed. For example, some components of the machine learning system 116, such as the input and output devices and the one or more processors 212, can be local to, e.g., a member of a film production team, whereas other components (e.g., the one or more processors 212 and/or the system memory 214 or portions of the system memory 214 (e.g., the portion that includes a batch processing MLM module, a matte generator, a metadata generator, an audio processor, or other aspects of the machine learning model)) can be remote from the user. For example, such remote components can be located in and provided by a cloud computing system with access to such components being provided to user via a network and the user's local system components. In some embodiments, the machine learning system 116 includes a server that runs the machine learning model. In some embodiments, the machine learning system 116 includes the processed footage database 120 to store metadata-tagged footage.

Figure 3:
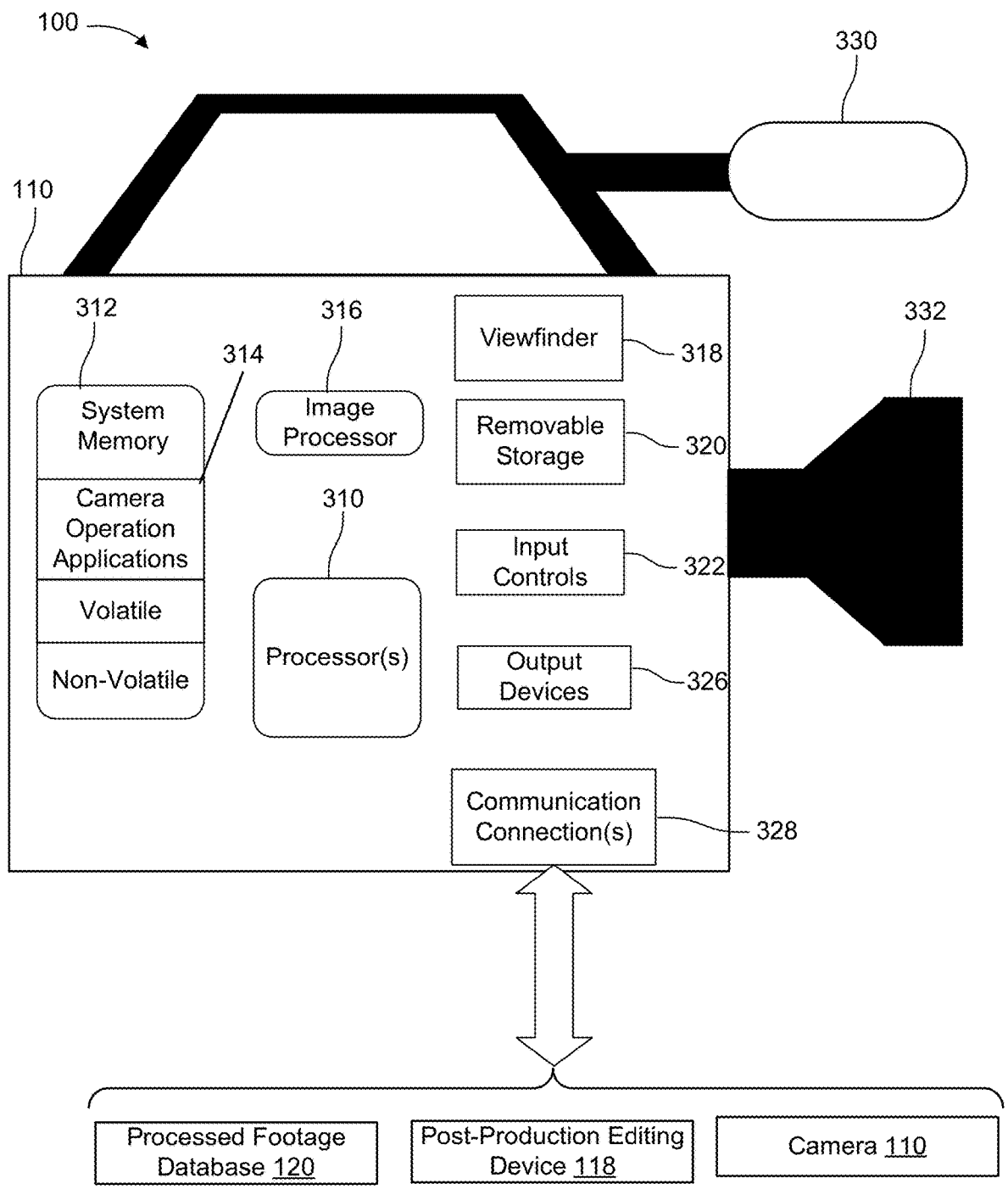
FIG. 3 depicts a block diagram of example components of the video camera of FIG. 1.

FIG. 3 depicts example components of the batch processing system 100 of FIG. 1. In the shown embodiment, the camera 110 includes one or more processors 310 coupled to system memory 312. The camera 110 also includes an image processor 316, a viewfinder 318, a removable storage 320, input controls 322, output devices 326, communication connection(s) 328, and a lens 332. In some embodiments, the camera 110 includes a microphone 330.

The one or more processors 310 may be similar to the one or more processors 212 and the system memory 312 may be similar to the system memory 214. The system memory 312 may differ from the system memory 214 by including camera operation applications 314. In some embodiments, camera operation applications 314 are configured to adjust capture settings of the camera. In some embodiments, the camera operation applications 314 is configured to operate a user interface coupled to the input controls 322. Further, the camera 110 includes an image processor 316. The image processor 316 is configured to convert the raw signal from an image sensor in the lens into a usable digital image. In some embodiments, the image processor 316 is configured to perform noise reduction, white balance correction, color correction, and sharpening. The image processor 316 may also be configured to perform high dynamic range (HDR) imaging and scene recognition.

The camera 110 also includes viewfinder 318. The viewfinder is configured to frame and compose shots. In some embodiments, the viewfinder is an optical viewfinder that shows the scene directly through the lens. In some embodiments, the viewfinder 318 is an electronic viewfinder that displays a digital image of the scene. The camera 110 also includes a removable storage 320. For example, the removable storage 320 may be a secure digital (SD) card for storing images. Further, the camera 110 includes input controls 322. In some embodiments, the input controls 322 are buttons and/or dials on the camera body that are configured to adjust settings like shutter speed, aperture, and sensitivity to light according to the International Organization for Standardization (ISO).

The camera 110 further includes output devices 326 such as a display screen for previewing footage. The camera 110 also includes communication connections 328, similar to communication connection(s) 226, for connecting to the machine learning system 116. Further, the camera 110 includes a lens 332 for capturing footage. In some embodiments, the lens 332 includes optics, an aperture, and a focus. In some embodiments, the camera 110 includes a microphone 330 for capturing audio data in conjunction with video data. In some embodiments, the camera 110 transmits digital footage in real-time.

In some embodiments, the system 100 (FIG. 1) includes one or more audio devices and/or other audio equipment not integrated with the camera 110 that is/are configured to capture audio data in conjunction with the capture of footage by one or more cameras, such as the camera 110.

Figure 4:
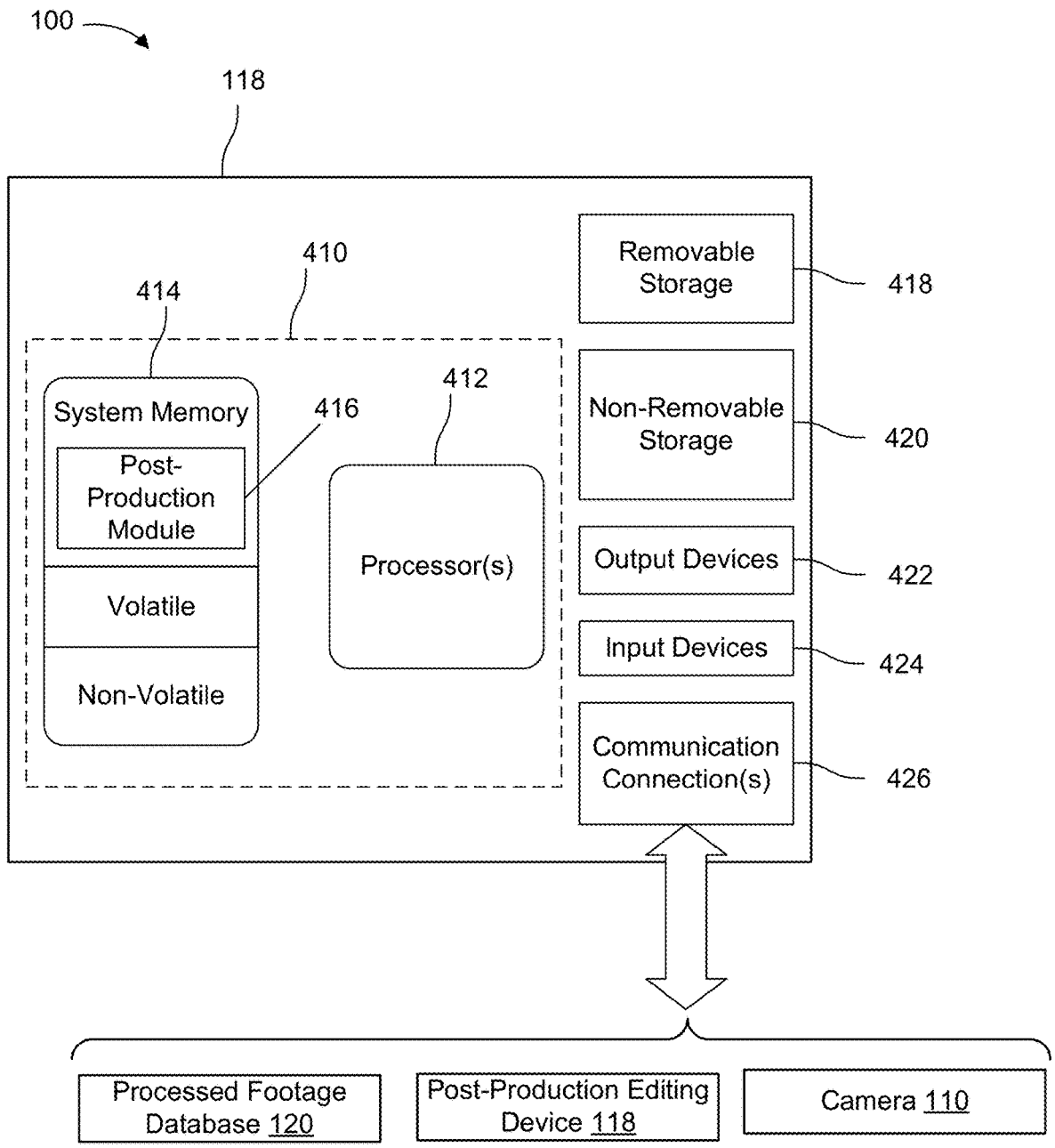
FIG. 4 depicts further example components of the batch processing system of FIG. 1.

FIG. 4 depicts further example components of the batch processing system 100 of FIG. 1. In the shown embodiment, the post-production device 118 includes computing components 410, which includes one or more processors 412 and system memory 414. The post-production device 118 also includes removable storage 418, non-removable storage 420, output devices 422, input devices 424, and communication connection(s) 426.

In some embodiments, each of the shown components is configured in the same or similar way to the corresponding components of the machine learning system 116. The system memory 414 includes the post-production module 416. In some embodiments, the post-production module 416 includes instructions that cause the one or more processors 412 to perform certain operations. The instructions include causing the processor(s) to transmit first signals to the machine learning system 116 to cause a post-production task to be performed based on the digital elements. In some embodiments, the instructions include performing the post-production task. In some embodiments, the batch processing MLM module 216 is included within system memory 414. That is, the post-production device 118 can perform all or some of the post-production tasks described herein. The post-production task may include at least one of generating a matte corresponding to the digital elements, determining image depths of the digital elements within the first digital footage, identifying missing dialogue based on a dialogue script, cutting a scene from the first digital footage, splicing scenes from the digital footage, playing back a scene from second digital footage having a digital element of the defined type, matching a first shot from the first digital footage with a second shot from the second digital footage, combining the first shot from the first digital footage with the second shot from the digital second footage, removing the digital elements from the first digital footage, replacing the digital elements in the first digital footage with other digital elements, removing audio noise, adding sound, syncing audio to the first digital footage, and/or adjusting an audio quality of the digital elements.

Figure 5:
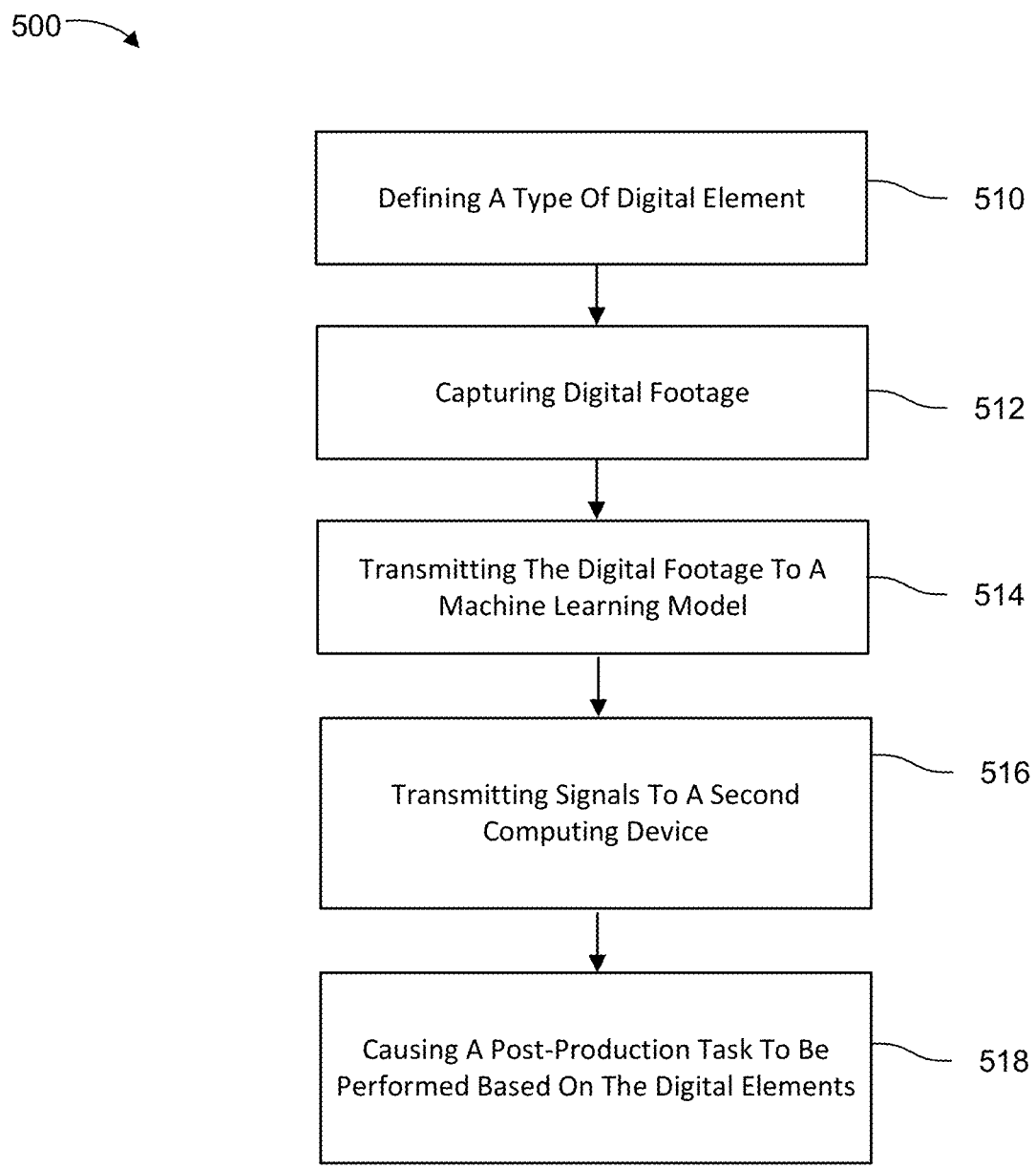
FIG. 5 depicts an example method performed by the batch processing system of FIG. 1.

FIG. 5 depicts an example method performed by the batch processing system 100 of FIG. 1. In the shown embodiment, the method 500 includes a step 510 in which a type of digital element is defined. The method 500 also includes a step 512 in which digital footage is captured. The method 500 also includes a step 514 in which the digital footage is transmitted to a machine learning model. The method 500 also includes a step 516 in which signals are transmitted to a second computing device. The method 500 also includes a step 518 in which a post-production task is caused to be performed based on the digital elements. Some or all of the included steps 510-516 may be performed by the batch processing system 100 or one or more of batch processing system 100's components.

At a step 510 of the method 500, a type of digital element is defined by a first computing device to provide a defined type. In some embodiments, the first computing device is the post-production device 118.

At a step 512 of the method 500, first digital footage is captured by a camera. In some embodiments, the camera is camera 110.

At a step 514 of the method 500, the first digital footage is transmitted to a machine learning model while the camera is performing the raw footage capturing. In some embodiments, the MLM is included and operated by the machine learning system 116. In some embodiments, the machine learning model is configured, during the transmitting, to process the plurality of first digital image frames simultaneously to simultaneously identify digital elements associated with each of at least two of the plurality of first digital image frames, each of the digital elements having the defined type.

At a step 516 of the method 500, the first signals are transmitted from the first computing device to a second computing device. In some embodiments, the second computing device is the machine learning system 116.

At a step 518 of the method 500, a post-production task is caused to be performed based on the digital elements. In some embodiments, signals generated and transmitted by the post-production device 118 cause the post-production task to be performed.

In some embodiments, the method 500 further includes generating, by the machine learning model, metadata corresponding to the digital elements for the at least two of the plurality of first digital image frames. In some embodiments, the method 500 further includes performing, by the second computing device, the post-production task. In some embodiments, the post-production task includes generating a matte corresponding to the digital elements, determining image depths of the digital elements within the first digital footage, identifying missing dialogue based on a dialogue script, cutting a scene from the first digital footage, splicing scenes from the digital footage, playing back a scene from second digital footage having a digital element of the defined type, matching a first shot from the first digital footage with a second shot from the second digital footage, combining the first shot from the first digital footage with the second shot from the digital second footage, removing the digital elements from the first digital footage, replacing the digital elements in the first digital footage with other digital elements, removing audio noise, adding sound, syncing audio to the first digital footage, or adjusting an audio quality of the digital elements.

Figure 6:
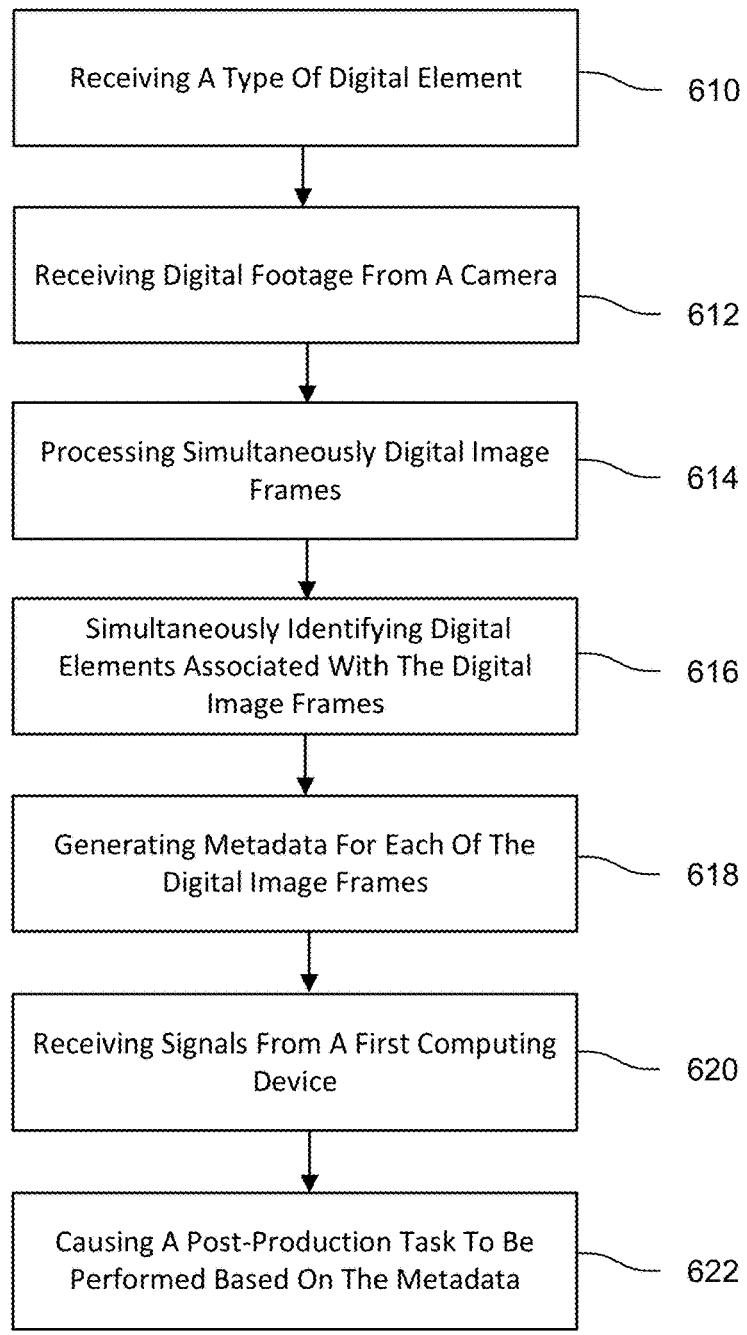
FIG. 6 depicts an additional example method performed by the bath processing system of FIG. 1.

FIG. 6 depicts example components of the batch processing system 100 of FIG. 1 that can be applied in a variety of example use cases. In the shown embodiment, the method 600 includes a step 610 in which a type of digital element is received. The method 600 also includes a step 612 in which digital footage is received from a camera. The method 600 also includes a step 614 in which digital image frames are processed simultaneously. The method 600 also includes a step 616 in which digital elements associated with the digital image frames are simultaneously identified. The method 600 also includes a step 618 in which metadata is generated for each of the digital image frames. The method 600 also includes a step 620 in which signals are received from a first computing device. The method 600 also includes a step 622 in which a post-production task is caused to be performed based on the metadata. Some or all of the included steps 610-618 may be performed by the batch processing system 100 or one or more of the batch processing system 100's components.

At a step 610 of the method 600, a type of digital element corresponding to a defined type is received. In some embodiments, the first computing device is the post-production device 118.

At a step 612 of the method 600, first digital footage is received. The first digital footage is transmitted by a camera while the camera is capturing first digital footage. Also, the first digital footage includes a plurality of first digital image frames. In some embodiments, the camera is the camera 110.

At a step 614 of the method 600, the plurality of first digital image frames are processed simultaneously by a machine learning model. In some embodiments, the machine learning model is included with machine learning system 116.

At a step 616 of the method 600, the digital elements are simultaneously identified by their defined types and associated with each of at least two of the plurality of first digital image frames, each of the digital elements having the defined type.

At a step 618 of the method 600, metadata is generated by the machine learning model for each of the at least two of the plurality of first digital image frames. The metadata tags each of the at least two of the plurality of first digital image frames based on the defined type.

At a step 620 of the method 600, first signals are received from the first computing device. In some embodiments, the machine learning system 116 receives the first signals from the post-production device 118.

At a step 622 of the method 600, a post-production task is caused to be performed based on the metadata. In some embodiments, the first signals cause the post-production task to be performed by the post-production device 118. The post-production task may be any of the post-production tasks previously described.

In some embodiments, the method 600 further includes generating, by the machine learning model, metadata corresponding to the digital elements for the at least two of the plurality of first digital image frames. In some embodiments, the method 500 further includes performing, by the second computing device, the post-production task. In some embodiments, the post-production task includes generating a matte corresponding to the digital elements, determining image depths of the digital elements within the first digital footage, identifying missing dialogue based on a dialogue script, cutting a scene from the first digital footage, splicing scenes from the digital footage, playing back a scene from second digital footage having a digital element of the defined type, matching a first shot from the first digital footage with a second shot from the second digital footage, combining the first shot from the first digital footage with the second shot from the digital second footage, removing the digital elements from the first digital footage, replacing the digital elements in the first digital footage with other digital elements, removing audio noise, adding sound, syncing audio to the first digital footage, and/or adjusting an audio quality of the digital elements.

Figure 7:
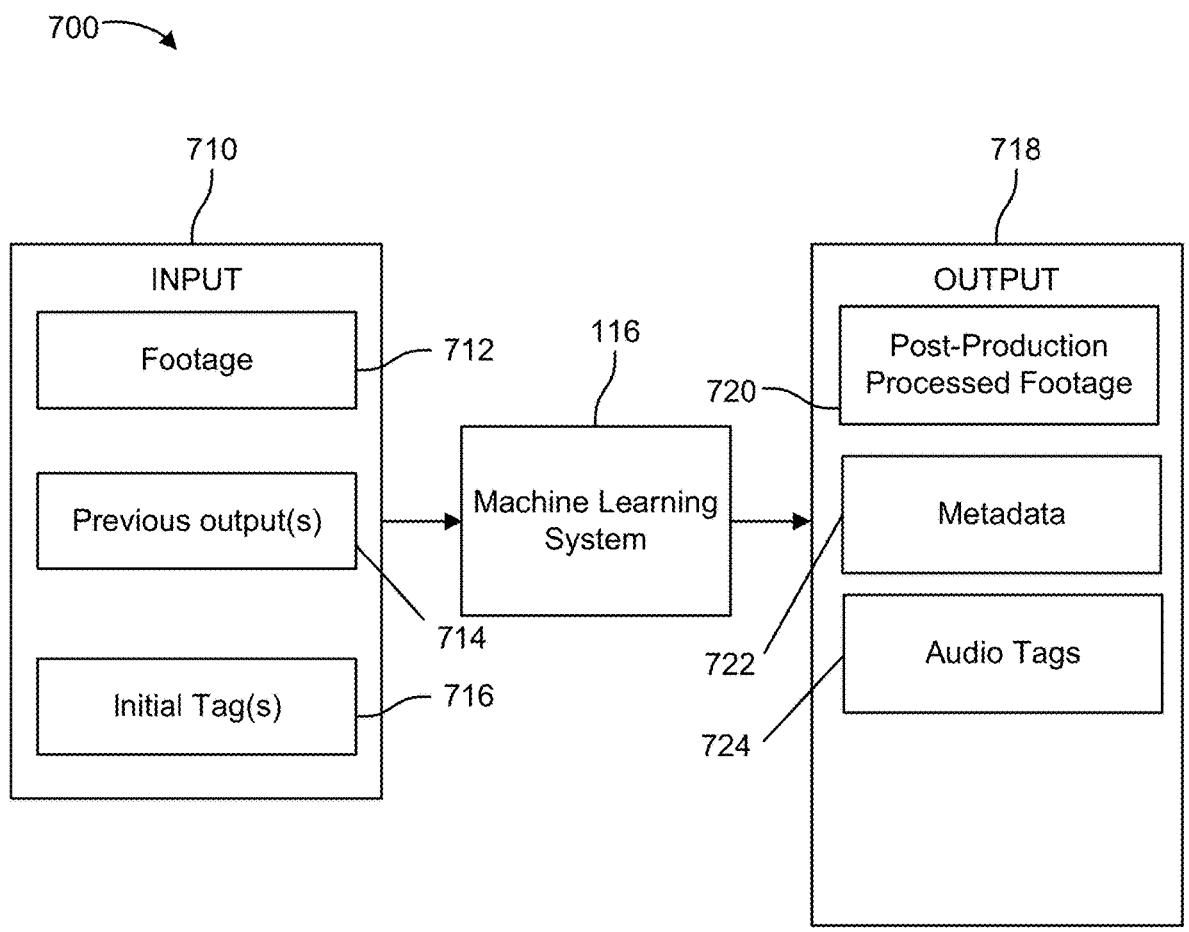
FIG. 7 depicts example components of the batch processing system of FIG. 1 that can be applied in a variety of example use cases.

FIG. 7 depicts example components of the batch processing system 100 of FIG. 1 that can be applied in a variety of example use cases. In the shown embodiment, the data flow 700 includes input 710, which includes footage 712, initial tag(s) 716, and in some embodiments previous output(s) 714. The input 710 is fed to machine learning system 116 that then outputs output 718, which includes post-production processed footage 720, metadata 722, and audio tags 724.

The input 710 is fed to the machine learning system 116. Based on the received input 710, a machine learning model within the machine learning system 116 uses algorithms as previously described to provide the output 718. In some embodiments, some or all of the input 710 is received from camera 110. In some embodiments, the input 710 is received from a separate device such as processed footage database 120. In some embodiments, the footage 712 received by the machine learning system 116 in real time as captured by camera 110. In some embodiments, the footage 712 is digital footage. Further, some examples include providing the input 710 from stored system memory 214, removable storage 218, or non-removable storage 220. In some embodiments, the input 710 is provided to the MLM included with the batch processing MLM module 216. The machine learning model then produces the output 718.

In some embodiments, previous output(s) 714 is fed into the machine learning system 116. The machine learning system 116 learns from receiving previous output(s) as described above, tuning the weights of its algorithms and reducing digital element type prediction errors.

In some embodiments, the initial tagged frame examples 716 are frames with known digital element features that have been automatically generated by the machine learning system 116. In some embodiments, the initial tagged frame examples 716 are supplied by the post-production device 118. If included, the initial tagged frame examples 716 may train the machine learning system 116 to tag raw footage that is used as input.

After processing the input 710, the machine learning system 116 produces output 718. In some embodiments, the post-production processed footage includes footage that has been tagged with digital element type-specific metadata. The machine learning system 116 produces the post-production processed footage 720. In some embodiments, the metadata 722 includes tags for the post-production processed footage 720. The tags indicate different digital elements, such as a particular object, actor/actress, background, setting, effect, and the like. The metadata 722 is paired or otherwise linked with the corresponding frames of the post-production processed footage 720.

Figure 9:
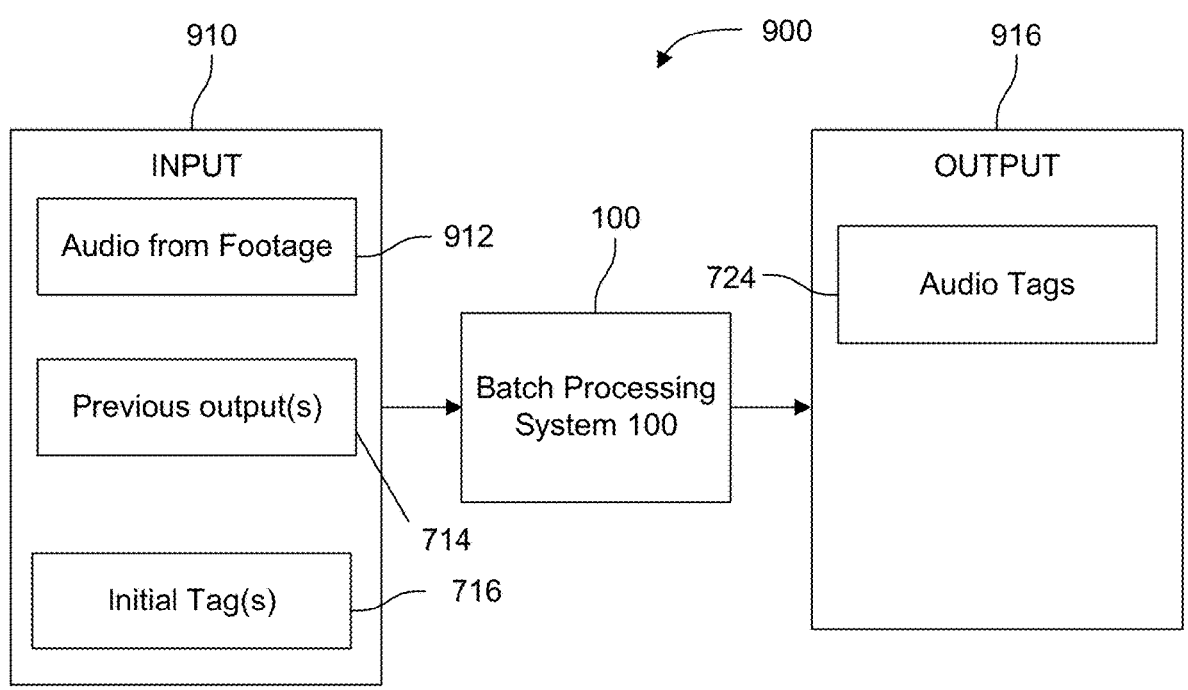
FIG. 9 depicts further example components of the batch processing system of FIG. 1 applied in an example use case.
Figure 10:
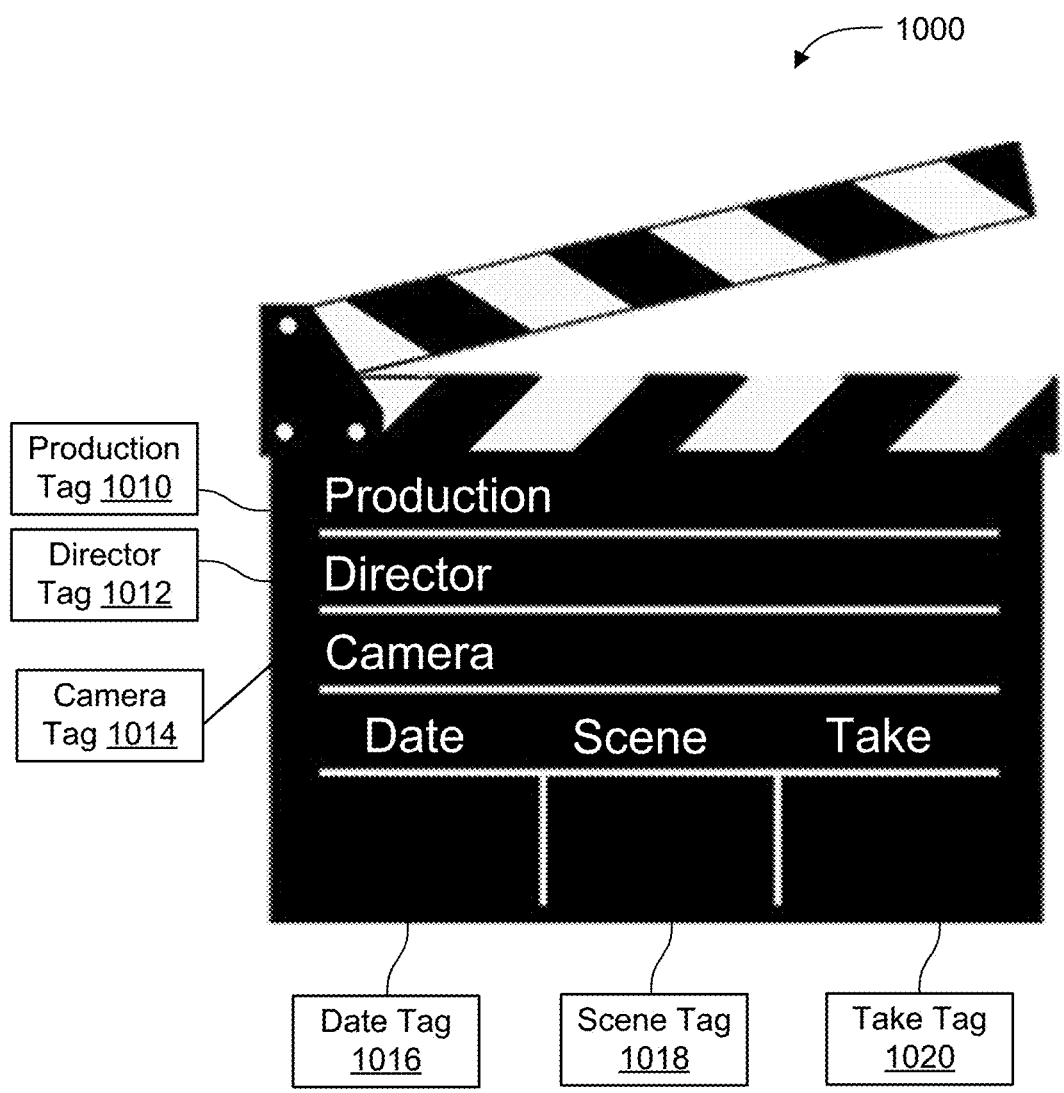
FIG. 10 depicts an example slate for generating metadata by the batch processing system of FIG. 1.

The machine learning system 116 is also configured to produce audio tags 724 which is discussed in conjunction with FIGS. 9-10.

Figure 8:
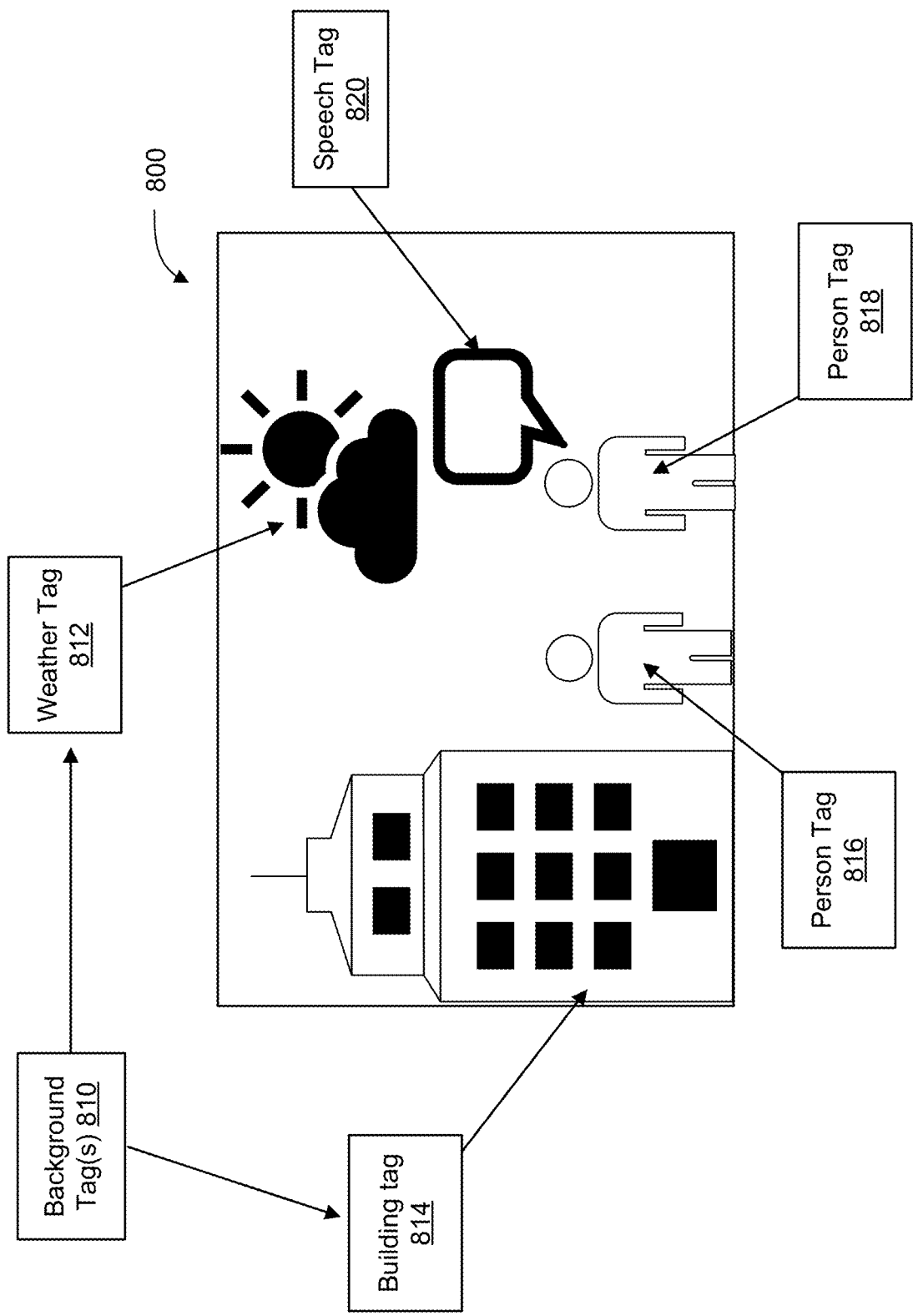
FIG. 8 schematically depicts an example footage frame generated by the camera of FIG. 1 with associated metadata generated by the batch processing system of FIG. 1.

FIG. 8 schematically depicts an example footage frame 800 generated by the camera 110 of FIG. 1 with associated metadata generated by the batch processing system 100 of FIG. 1. In the shown embodiment, the frame 800 is a processed frame from the machine learning system 116 with associated metadata. The frame 800 is tagged with metadata. The metadata tags various different digital elements associated with the frame 800. For instance, the metadata tags include background tag(s) 810, which includes a weather tag 812 and a building tag 814. Further, the footage 800 includes a person tag 816 and a person tag 818. The footage 800 also includes an associated speech tag 820.

In some embodiments, the background tag(s) 810 identify different digital elements of the background. For example, the background tag(s) 810 may identify objects, lighting, or weather of a scene. In some embodiments, the building tag 814 corresponds to a particular building.

The metadata-tagged frame 800 is stored together without simultaneously process footage frames and can then be retrieved and modified by the post-production computing device 118. For example, the post-production computing device 118 can alter a tagged building wherever it appears in footage frame of a given scene. For example, altering the building's color or symbol carries through to all frames and scenes that have the building tag 814. In some examples, the person tag 816 and 818 correspond to a specific person. In some embodiments, alterations to the look of a person corresponding to the person tag 816 in one scene are replicated to all scenes with the person tag 816. In some embodiments, the footage 800 includes associated audio. In some embodiments, the associated audio is tagged with the speech tag 820. The speech tag 820 may include digital elements such as the person speaking. In some embodiments, the speech tag 820 is used to identify the person corresponding to the person tag 818. In some embodiments, the speech tag 820 is used to alter the speech of the scene. For example, the post-production computing device 118 may alter the words, tone, inflection, or other digital elements of the speech associated with all footage frames tagged with the speech tag 820.

In some embodiments, each of the metadata tags include associated digital elements. In some embodiments, the machine learning model of the machine learning system 116 is configured to generate metadata for each of at least two of a plurality of first digital image frames, the metadata tagging each of the at least two of the plurality of first digital image frames based on the defined type.

FIG. 9 depicts further example components of the batch processing system 100 of FIG. 1 applied in an example use case. In the shown embodiment, data flow 900 includes an input 910 that is received by the machine learning system 116. The input 910 includes audio from footage 912, previous output(s) 714, and initial tag(s) 716. Based on the input 910, the machine learning system 116 produces output 916.

The machine learning system 116 produces audio tags 724. In some embodiments, the machine learning system 116 uses an included machine learning model within the batch processing MLM module 216 to produce output 916.

In some embodiments, the audio tags 724 identify digital elements of the tagged audio including audio effects. For example, all scenes with a first audio tag may have a sound effect added to the audio of the scene. In some embodiments, the audio tags 724 identify the actor/actress. The audio tags 724 are used to produce other metadata about the scene, and the audio tags 724 are used to increase the confidence in identifying objects or people.

In some embodiments, the audio form footage 912 is captured by the camera 110. In other embodiments, it is captured by a different sound detection device, such as a boom microphone. In some embodiments, previous output(s) is/our received by the machine learning system 116 to train the machine learning model included with the machine learning system 116.

In some embodiments, the post-production device 118 modifies the audio based on the audio tags 724. The post-production device 118 may produce processed audio that includes smoothed out audio. For example, background noise may be removed. In other examples, voice volume may be increased while background noise is decreased. This task may increase emphasis on an actor/actress's voice rather than other sounds. In some embodiments, the processed audio 724 includes audio that is synched with the scene, such as an actor's lips. For example, the post-production device 118 performs lip smoothing.

FIG. 10 depicts an example slate 1000 for generating metadata by the batch processing system 100 of FIG. 1. In the shown embodiment, tags 1010-1020 are produced by analyzing raw footage containing an image of the slate 1000 by the batch processing system 100. The generated tags include, for example, a production tag 1010, a director tag 1012, a camera tag 1014, a date tag 1016, a scene tag 1018, and take tag 1020.

In some embodiments, the tags produce metadata for all frames and footage associated with the scene identified on the slate 1000. For example, the production tag 1010 is generated by analyzing the slate at the beginning of a take, which is then added to metadata of all footage from this particular scene, take, and camera. All footage associated with this scene is tagged with the production tag 1010. The remaining tags are added to metadata of the footage in the same or similar way.

Figure 11:
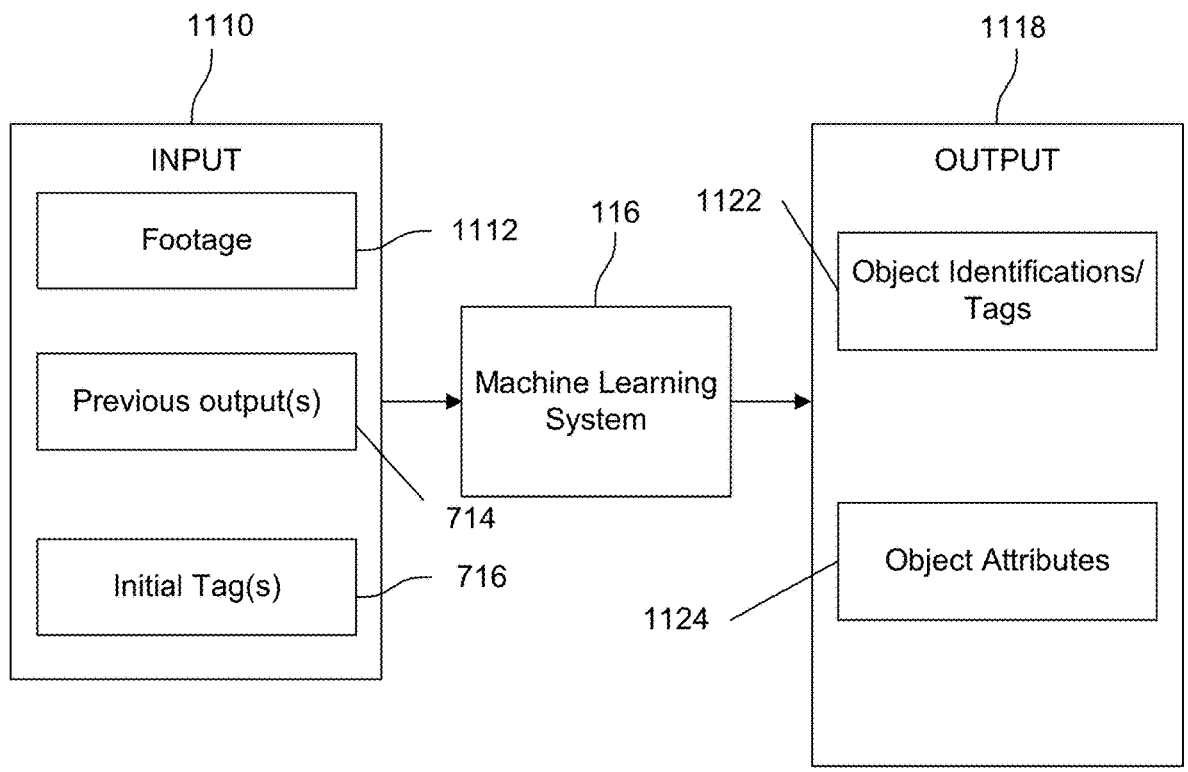
FIG. 11 depicts further example components of the batch processing system of FIG. 1 applied in another example use case of the post-production task of matte generation.

FIG. 11 depicts further example components of the batch processing system 100 of FIG. 1 applied in another example use case of the post-production task of matte generation.

Referring to FIG. 11, the machine learning system 116 receives input 1110, processes the input 1110 by applying one or more algorithms to parameters derived from the input 1110, and provides an output 1118 based on the input 1110.

The input 1110 can be provided via the camera 110, the processed footage database 120 or another source, such as within the system memory 214, removable storage 218, or the non-removable storage 220. The output 1118 can be provided via the output devices 222.

The machine learning system 116 includes at least one machine learning model as described above.

The input 1110 can include video footage 1112 (e.g., raw video footage), one or more initial tags 716, and one or more previous outputs 714 of the machine learning system 116. In some examples, the input can include just the footage 1112, or just the footage 1112 and the previous output(s) 714, or just the footage 1112 and the initial tag(s) 716. For instance, at the beginning of the matte generation process for a given film or other moving image, the input 1110 can include just the footage (e.g., the footage taken on the first day of shooting) and the initial tag(s) 716.

The footage 1112 can be provided to the machine learning system 116 via the component 210 and/or via the input devices 224 from camera 110.

The previous output(s) 714 can be provided to the machine learning system 116 via the storage 218, 220 or the system memory 214, or via another database.

The initial tag(s) 716 can be provided to the machine learning system 116 via the input device(s) 224 or 424.

The footage 1112 includes a sequence of digital image frames. The frames are captured by a video capturing device, such as a video camera, and converted to digital images. In other examples, the frames are generated or captured without a camera and with one or more other electronic devices, such as in the case of an animated moving image.

The footage 1112 can include non-image data from which the machine learning system 116 can also learn how to identify tagged objects. For example, the footage 1112 can include audio data as well, such as the sounds generated by tagged objects (e.g., a voice of a person, an engine of a vehicle). Such data can augment the machine learning system 116's ability to confidently identify tagged objects for purposes of generating corresponding mattes. For instance, a film may include identical twin characters whose voices have different acoustic characteristics. The machine learning system 116 can learn from such audio data to better differentiate between the two characters, based on the acoustic characteristics, in video footage for purposes of generating mattes for each of the twins' characters and/or for other post-production tasks. The audio data can be cross-referenced with facial recognition imaging to better label individuals or other sound producing objects for the mattes.

In some examples, the sound analysis performed by the machine learning system 116 can be used for purposes other than matte generation. For example, the sound analysis can be used to generate audio search criteria for searching and organizing clips of the footage based on sound. This can occur, for example, during the film editing process.

The previous output(s) 714 can include previous identifications of objects made by the machine learning system 116, previous matte(s) generated by the machine learning system 116 (e.g., from prior footage for the same film) and/or previous object attributes for objects corresponding to those mattes or identifications.

The initial tag(s) 716 identify objects for matte generation so that the machine learning system 116 can learn how to identify those same objects in different footage. For example, the tags can identify image data of specific people (such as a character in a movie), faces, animals and other objects. The machine learning system 116 learns to associate those tags with images of the corresponding objects to thereby differentiate between objects in subsequent footage that will require mattes.

In some examples, the input 1110 can also include other image data, such as footage taken from other moving images that include one or more of the same objects as the current footage 1112 and from which the machine learning system 116 can learn how to identify those objects in the footage 1112.

The output 1118 of the machine learning system 116 can also include object identification metadata or tags 1122. The tags 1122 can be applied to every frame of the footage 1112 that includes one or more of the objects corresponding to the tags 1122, regardless of whether those frames will make the final cut are be used to generate a matte. Then, specific frames can be identified or selected for generating mattes by the post-production device 118.

The output 1118 of the machine learning system 116 can also include metadata tags corresponding to other digital elements relevant to the particular post-production task (in this case, matte generation) such as one or more object attributes 1124. Some non-limiting examples of such objects can include a person, a body part, a face, an animal, a tree, a sky, a planet, a mountain, a vehicle, an entire background, an entire foreground, etc. Such attributes 1124 can include, for example, an image depth attribute, an orientation attribute, a brightness attribute, and/or an angle of light incidence attribute. Other attributes are possible. The attributes can correspond to each frame that has been analyzed regardless of whether there is ultimately an associated matte. The attributes can also correspond to objects in mattes. The attributes 1124 can, e.g., enhance how a matte is used with other mattes to generate modified footage. For example, a depth attribute can define how deep into the image frame (e.g., between foreground and background) the object is. The orientation attribute can define how the object is situated, e.g., is the person facing forward, backward or to the side, or at some angle to one of these orientations. The light incidence attribute can define the angle at which light is incident on the object. A brightness attribute can define how bright the image is at the object.

The attributes 1124 can assist the post-production device 118 in ensuring that a matte of the corresponding object is combined with other mattes having the same attributes as the matte, thereby providing modified footage that is visually seamless and realistic. For example, the attributes can be used to ensure that the mattes that are combined with a given matte have the appropriate brightness, light source, depth features and so forth. For instance, matching the depth attribute of a first matte with other mattes that are combined with the first matte can ensure that, in the modified footage, the object of the first matte does not appear to close or too far for the surroundings.

By identifying attributes of objects together with their mattes, certain editing and other footage manipulation tasks that take place later in post-production (e.g., final color grading) can be performed more efficiently by referencing the attributes in mattes of the modified footage.

Figure 12:
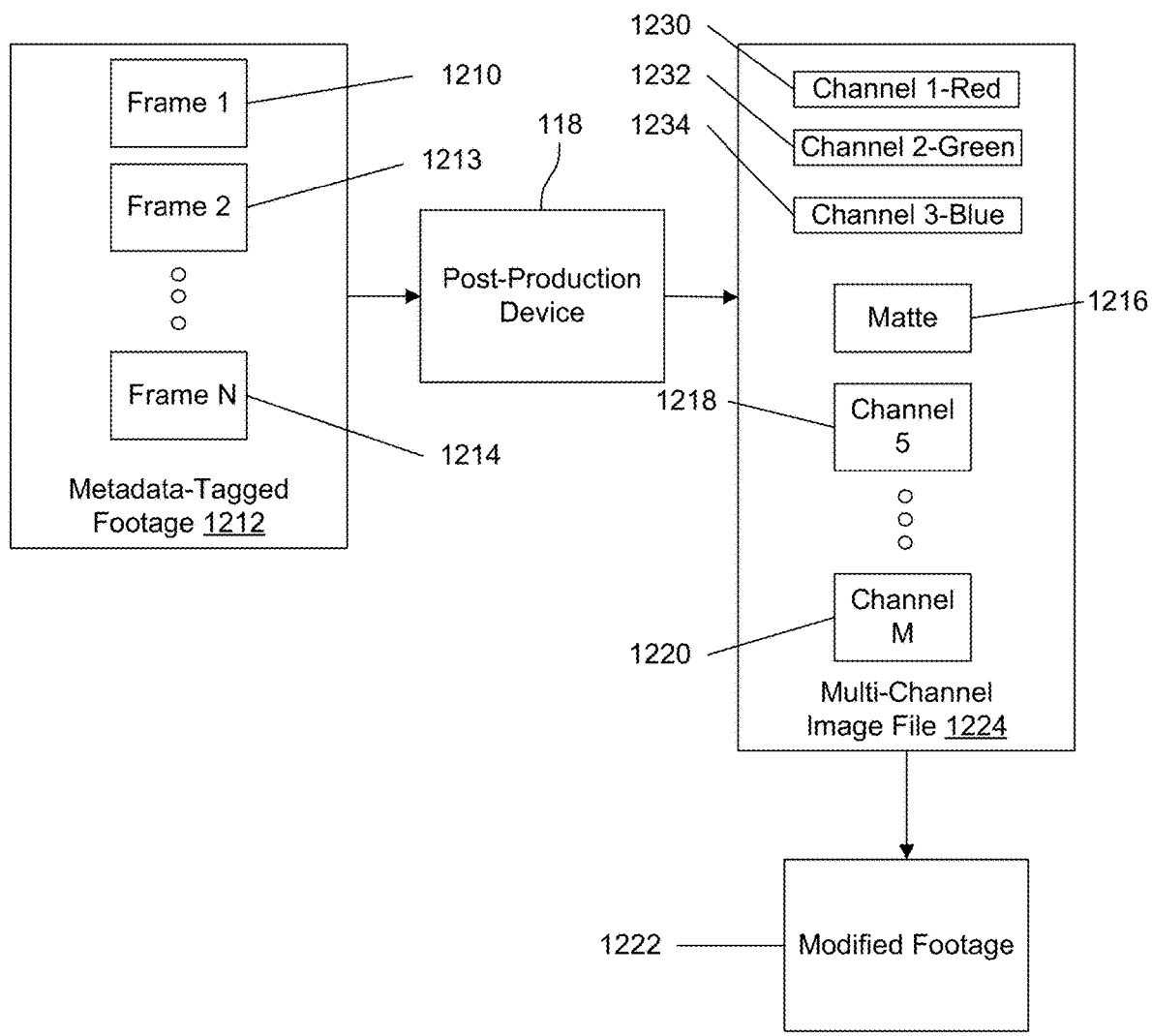
FIG. 12 depicts further example components of the batch processing system of FIG. 1 applied to a post-production task of matte generation.

FIG. 12 depicts further example components of the batch processing system 100 of FIG. 1 applied to a post-production task of matte generation.

Referring to FIG. 12, the metadata-tagged footage 1212 received from the machine learning system 116 includes a sequence of image frames. For example, the metadata-tagged footage 1212 can include a first frame 1210, a second frame 1213 up to an Nth frame 1214, where N is a positive integer greater than 2. For a given video production, the metadata-tagged footage 1212 can be updated as new footage is received, e.g., after the end of each shoot or after more animation is generated.

The post-production device 118 receives the tagged frames 1210, 1212, 1214 of the metadata-tagged footage 1212, identifies tagged objects in the frames 1210, 1212, 1214 using one or more algorithms and based on the metadata-tagged footage 1212 and other inputs as described herein and, in some examples, outputs a multi-channel image file 1224. In other examples, the file format output by the post-production device 118 is something other than a multi-channel image file. In some examples in which the output file is a multi-channel image file 1224, the multi-channel image file 1224 can be a raster format image file. In other such examples, other forms of multi-channel image files can be used.

The post-production device 118 generates one or more mattes for one or more objects in the frames 1210, 1212, 1214, and stores an image file (e.g., the post-production device 118 stores, for each frame, the matte 1216 as a channel in a multi-channel image file 1224). For example, the file 1224 can include typical channels 1230, 1232 and 1234 for red, green, and blue, respectively, an additional channel 1216 for the matte, and further additional channels 1218 up to channel M 1220, wherein M is a positive integer greater than 3. In some examples, the file 1224 has exactly three or exactly four channels. In the example shown in FIG. 12, the matte 1216 can include the object attribute(s) 314 corresponding to the object of the matte. In some examples, such attributes can be associated with the image file 1224 in another manner, e.g., by storing the attributes as their own channel of the file 1224 or as metadata for the file 1224. In some examples, the channel chosen to store the matte is based on one or more object attributes of that matte.

For example, channels in a given multi-channel image file can correspond to a different image depth. In this manner, objects of mattes at different depths can be efficiently layered on top of one another based on the image depths corresponding to the mattes by combining the channels of a given multi-channel image file.

The other channels in the file 1224 can be used to construct modified footage or a modified frame of the footage. For example, the channel 1218 can be populated with another matte corresponding to another object for the same frame. Due to the structure of the multi-channel image file, it can be fast and efficient to then generate, by the post-production device 118, modified footage 1222 or a modified frame of footage by combining the channel 1218 with the matte 1216 into a new or modified digital image. That is, the multi-channel image file lends itself to efficiently performing an image layering process whereby mattes of various objects (e.g., the channels in the multi-channel image file) are combined by layering them one atop another to generate the final modified frame or footage that is desired.

As new footage is obtained (e.g., for a given film), the process depicted in FIG. 12 can be repeated, with the additional data allowing the machine learning system 116 to better learn how to generate digital element metadata to raw footage frames to provide additional metadata-tagged footage 1112.

The multi-channel image file 1224, such as a multi-channel raster format image file, is highly compatible with different software and hardware platforms, such that the matte 1216 can be easily shared and used by various different cohorts of the production and/or post-production teams without having to convert the matte 1216 into different computer readable formats, and without having to convert the matte from an analog format into a digital format.

Figure 13:
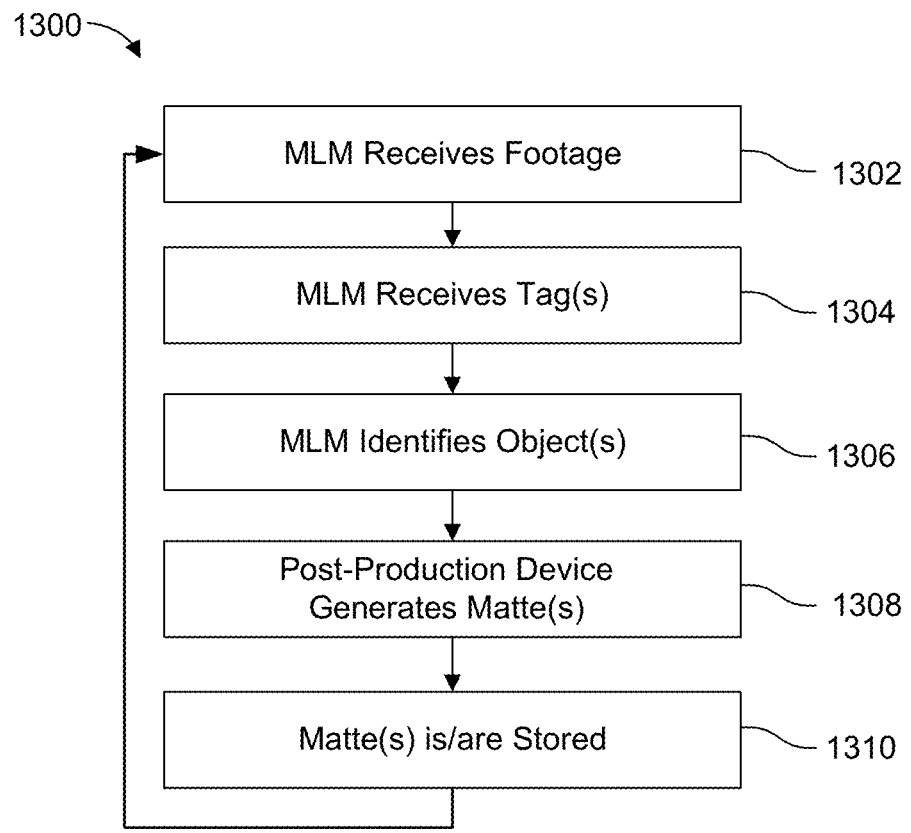
FIG. 13 depicts a method of generating a matte in accordance with examples of the present disclosure using the batch processing system of FIG. 1.

FIG. 13 depicts a method of generating a matte in accordance with examples of the present disclosure using the batch processing system 100 of FIG. 1.

Referring to FIG. 13, at step 1302 of the method 1300, a MLM (e.g., a machine learning model of the machine learning system 116) receives footage, e.g., raw video footage. In some examples, the footage includes both image data and non-image data, such as audio data.

At a step 1304 of the method 1300, the MLM receives one or more initial tags identifying image data corresponding to one or more objects for mattes. For example, the initial tags can be provided by a person involved with the production, or from prior footage that has been tagged.

At a step 1306 of the method 1300, the MLM using the footage and the tag(s) to identify (e.g., by tagging with metadata) the objects in one or more frames of the footage. In some examples, the MLM batch processes multiple frames of the footage simultaneously at the step 406. In some examples, the MLM identifies one or more image attributes of the identified objects at the step 406.

At a step 1308 of the method 1300, the post-production device 118 generates one or more matte(s) corresponding to one or more of the frames and one or more of the identified objects.

At a step 1310 of the method 1300, the one or more mattes are stored. In some non-limiting examples, the one or more mattes are stored as channels in one or more multi-channel image files.

In some examples, the process 1300 repeats as a loop as more footage becomes available, e.g., during the shooting of a film. The MLM can continue to learn and update its algorithm(s), parameters and weights for identifying objects and object attributes as more and more footage is fed to the MLM, thereby improving the accuracy of the MLM output that is used by the post-production device 118.

Figure 14:
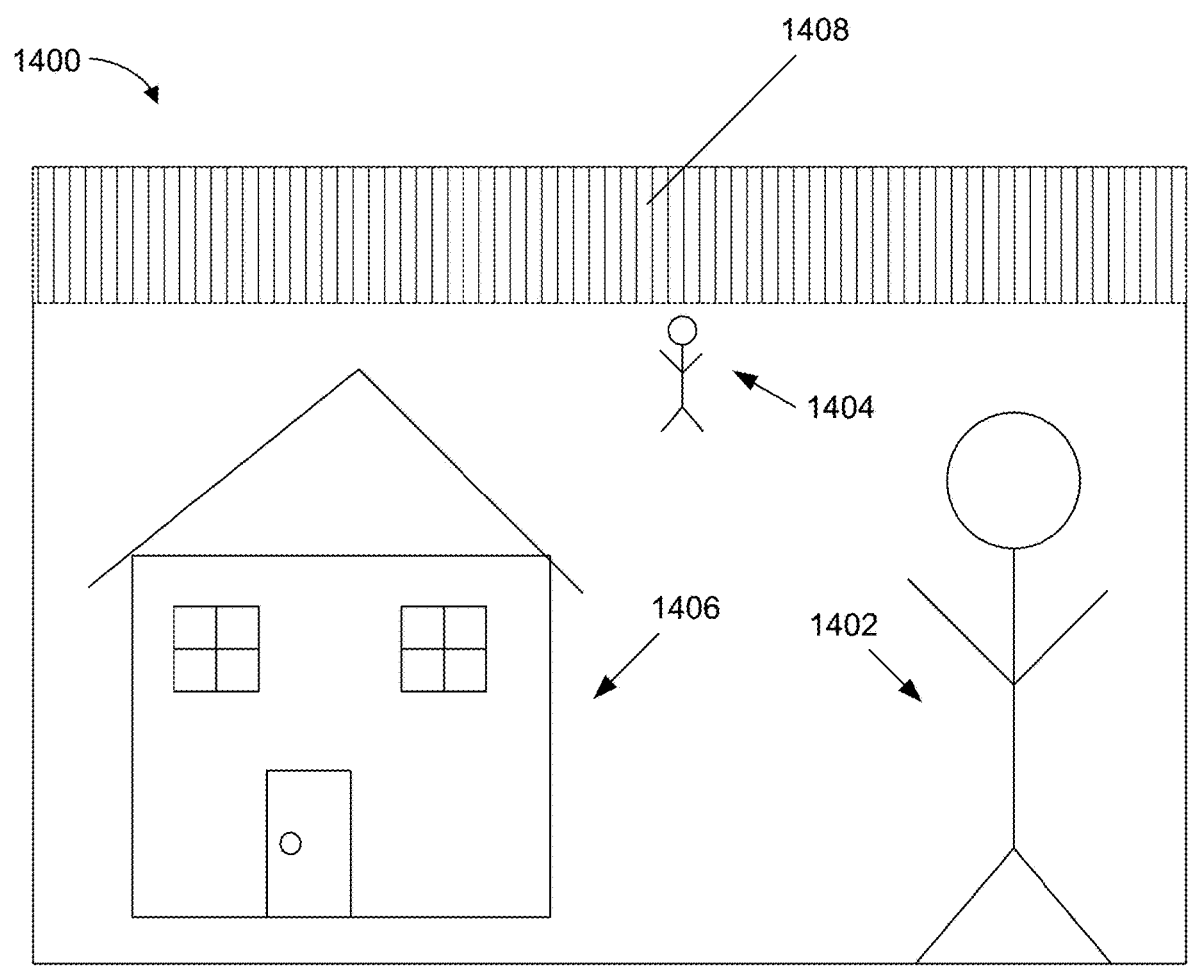
FIG. 14 is a schematic representation of another example frame of video footage.

FIG. 14 is a schematic representation of another example frame of video footage. The frame 1400 is an image that includes image data corresponding to a cloudy sky 1408, a house 1406, a first person 1402 in the foreground and a second person 1404 in the background. That is, the second person 1404 is deeper in the frame 1400 than the first person 1402. The frame 1400 can be taken by a video capturing device (e.g., the camera 110) on a film set of a studio, for example. Alternatively, the frame 1400 can be a frame of animation.

Figure 15:
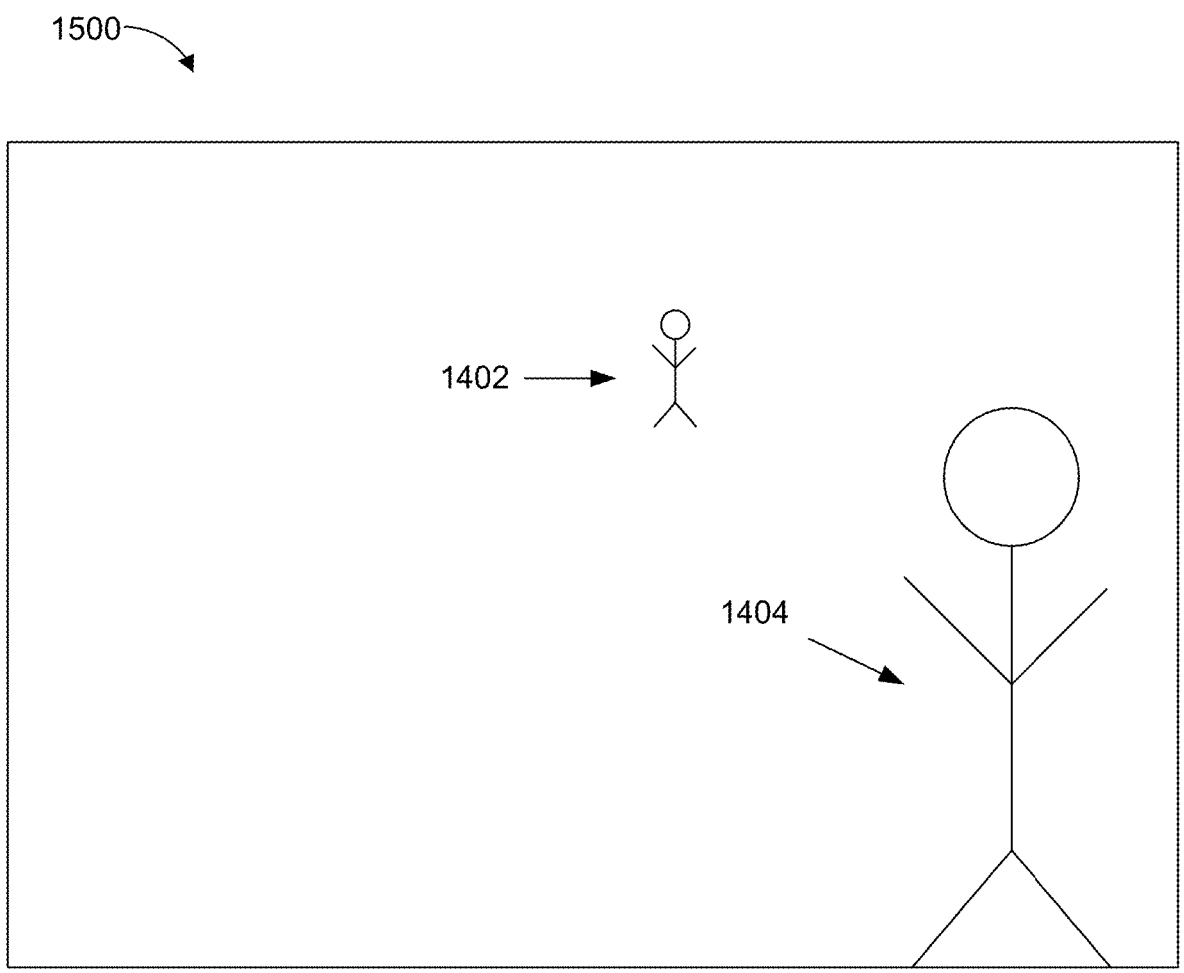
FIG. 15 is a schematic representation of a matte generated by the batch processing system of FIG. 1 based on the frame of FIG. 13.

FIG. 15 is a schematic representation of a matte generated by the batch processing system 100 of FIG. 1 based on the frame of FIG. 14. To generate the matte 1500, the machine learning system 116 has identified and tagged with metadata objects including the person 1402 and the person 504. The post-production device 118 has masked the cloudy sky 1408 and the house 1406. The machine learning system 116 has also determined object attributes of the objects 1402, 1404, such as their image depths. The object attributes can be stored together with the matte 1500 and/or provided as metadata corresponding to the stored matte 1500.

Alternatively, the matte 1500 may actually be a combination of two mattes corresponding to two different image depth attributes-one image depth matte including the person 1402, and the other image depth matte including the person 1404. In this example, the two mattes can be stored as different channels in a multi-channel image file, such as a multi-channel raster format file, and then the channels are combined to generate the composite matte 1500. Other storage formats are possible for the mattes.

In other examples, one or more simpler non-depth mattes are generated for one or more objects (e.g., a person), where the matte is independent of the depth of the one or more objects within the image(s). In such matte examples, depth attributes may not be used in certain instances, but used in other instances to enhance the matte quality.

Figure 16:
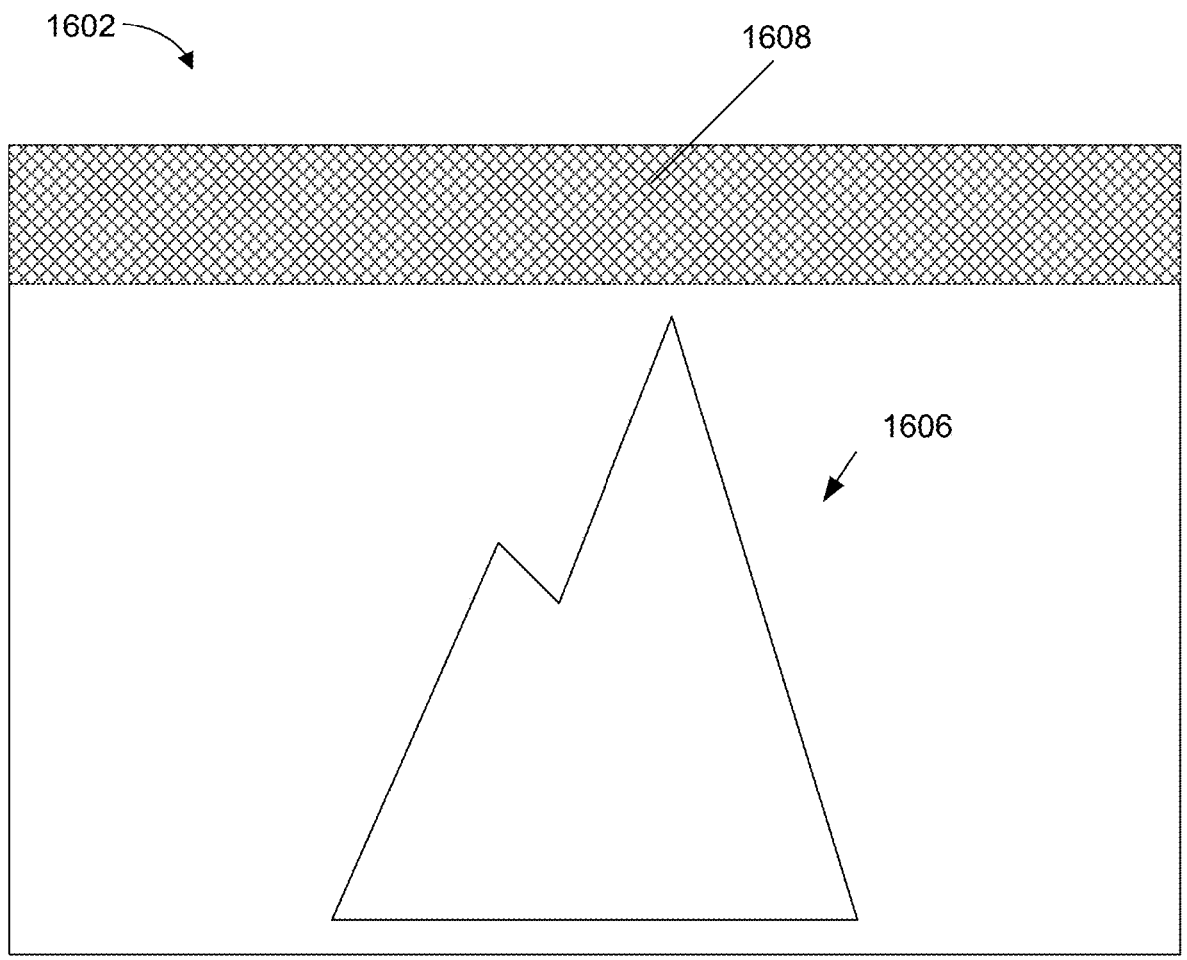
FIG. 16 is a schematic representation of another matte.

FIG. 16 is a schematic representation of another matte. The matte 1602 includes a sunny sky 1608 and a mountain 1606.

Figure 17:
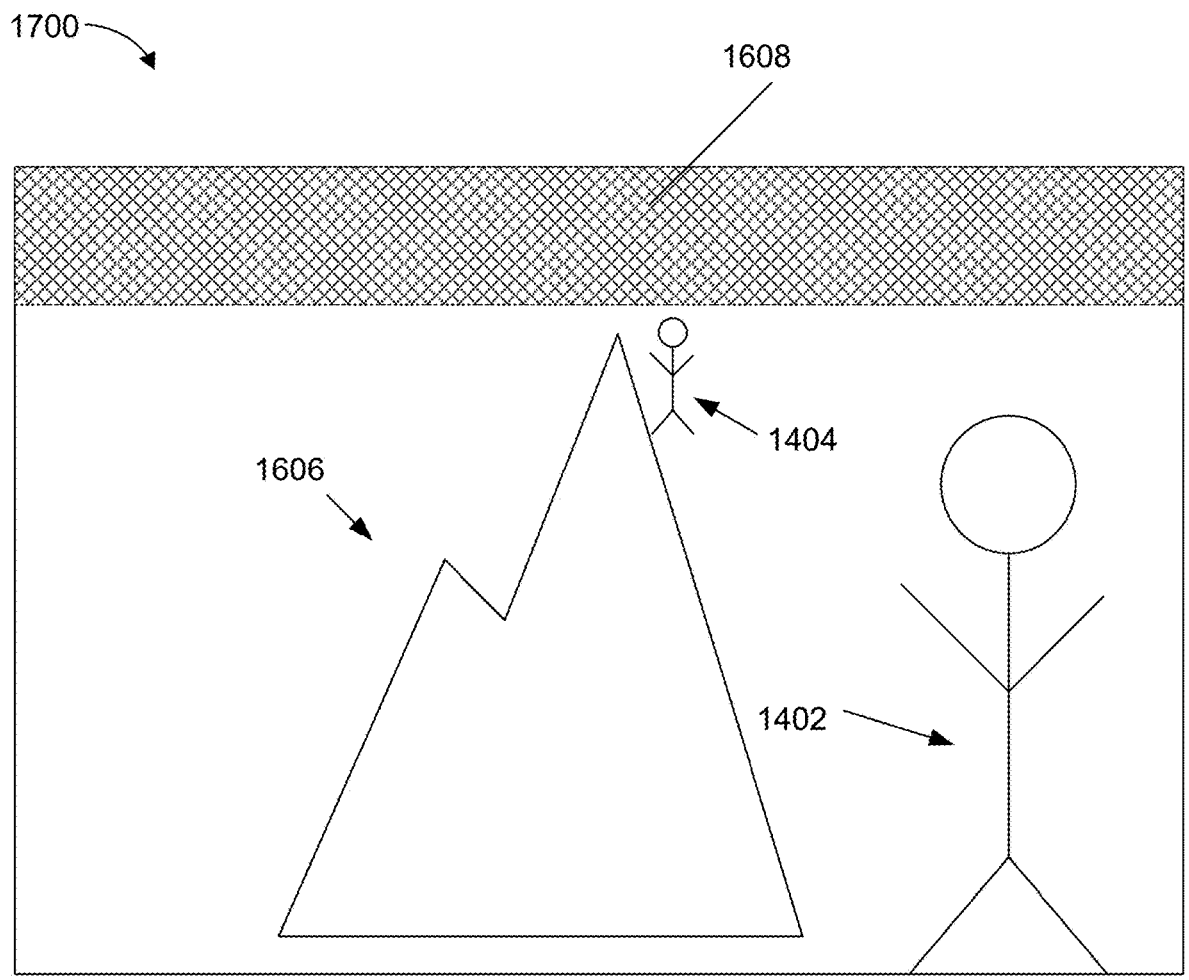
FIG. 17 is a schematic representation of a modified frame of the video footage of FIG. 13 and generated by the batch processing system of FIG. 1, including a composite of the matte of FIG. 14 and the matte of FIG. 15.

FIG. 17 is a schematic representation of a modified frame of the video footage of FIG. 13 and generated by the batch processing system 100 of FIG. 1, including a composite, generated by the post-production device 118, of the matte of FIG. 14 and the matte of FIG. 15. The object attributes (e.g., the image depth attributes of the people 1402 and 1404) have been used, e.g., in selecting the matte 1602 to combine with the matte 1500, such that the modified frame 1700 appears realistic and seamless, e.g., with the person 1404 climbing the mountain 1606 under a sunny sky 1608.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method for processing footage, comprising:
using a machine learning model to:
receive first footage;
receive a tag identifying an object in the first footage;
process the first footage, including to identify, based on the tag, a plurality of instances of the object, the plurality of instances of the object including an instance of the object in each of a plurality of frames of the first footage; and
generating, based on all of the plurality of instances, a matte corresponding to the object.

2. The computer-implemented method of claim 1, wherein to process includes to identify, based on the tags, the plurality of instances simultaneously.

3. The computer-implemented method of claim 1, further comprising:
storing the matte as a channel in a multi-channel raster format image file.

4. The computer-implemented method of claim 3, further comprising:
generating modified footage by combining the matte with another matte.

5. The computer-implemented method of claim 4, wherein the another matte is stored as another channel in the multi-channel raster format image file.

6. The computer-implemented method of claim 1, further comprising,
using the machine learning model to:
receive second footage, including multiple second image frames;
process the multiple second image frames simultaneously, including to identify, based on the tag, an instance of the object in one of the multiple second image frames; and
modifying, based on the instance of the object in the one of the multiple second image frames, the matte to generate a modified matte corresponding to the object.

7. The computer-implemented method of claim 1,
wherein to process the first footage includes, for each of the plurality of instances, to determine an image depth of the object within the first footage; and
wherein the matte defines a depth for the object based on the image depth.

8. The computer-implemented method of claim 7, further comprising,
using the machine learning model to:
receive second footage;
process the second footage, including to identify, based on the tag, an instance of the object in the second footage; and
modifying the matte by modifying the depth of the object defined by the matte, based on the instance of the object in the second footage.

9. The computer-implemented method of claim 1, wherein the object is one of a foreground image element, a background image element, an image of a person, or an image of a vehicle.

10. The computer-implemented method of claim 1, wherein to process the first footage includes to process audio data generated by the object in the first footage.

11. The computer-implemented method of claim 1, wherein the first footage is a sequence of images.

12. The computer-implemented method of claim 11, wherein the sequence of images is captured by a camera.

13. A system for processing footage, comprising:
one or more processors; and
non-transitory computer readable storage storing instructions which, when executed by the one or more processors, cause the system to:
provide, to a machine learning model, first footage;
provide, to the machine learning model, a tag identifying an object in the first footage such that the machine learning model processes the first footage, including identifying, based on the tag, a plurality of instances of the object, the plurality of instances of the object including an instance of the object in each of a plurality of frames of the first footage;
generate, based on all of the plurality of instances, a matte corresponding to the object; and
receive the matte.

14. The system of claim 13,
wherein the plurality of instances of the object are identified simultaneously.

15. The system of claim 13, wherein the non-transitory computer readable storage includes further instructions which, when executed by the one or more processors, cause the system to:
store the matte as a channel in a multi-channel raster format image file.

16. The system of claim 15, wherein the non-transitory computer readable storage includes further instructions which, when executed by the one or more processors, cause the system to:
generate modified footage by combining the matte with another matte.

17. The system of claim 16, wherein the another matte is stored as another channel in the multi-channel raster format image file.

18. The system of claim 13, wherein the non-transitory computer readable storage includes further instructions which, when executed by the one or more processors, cause the system to:
provide, to the machine learning model, second footage, including multiple second image frames such that the machine learning model processes the multiple second image frames simultaneously and identifies, based on the tag, an instance of the object in one of the multiple second image frames; and
modify, based on the instance of the object in the one of the multiple second image frames, the matte to generate a modified matte corresponding to the object.

19. The system of claim 13,
wherein the machine learning model determines, for each of the plurality of instances, an image depth of the object within the first footage; and
wherein the matte defines a depth for the object based on the image depth.

20. The system of claim 19, wherein the non-transitory computer readable storage includes further instructions which, when executed by the one or more processors, cause the system to:
provide second footage to the machine learning model such that the machine learning model processes the second footage and identifies, based on the tag, an instance of the object in the second footage; and
modify the matte by modifying the depth of the object defined by the matte, based on the instance of the object in the second footage.

21. The system of claim 13, wherein the object is one of a foreground image element, a background image element, an image of a person, or an image of a vehicle.

22. The system of claim 13, wherein the machine learning model processes audio data generated by the object in the first footage to generate the matte.

23. The system of claim 13, wherein the first footage is a sequence of images.

24. The system of claim 23, wherein the sequence of images is captured by a camera.

25. A computer-implemented method for processing footage, comprising:
- receiving, by a machine learning model, first signals generated by a computing device, the first signals providing first footage;
- receiving, by the machine learning model, second signals generated by the computing device, the second signals providing a tag, the tag identifying an object in the first footage;
- processing, by the machine learning model, the first signals and the second signals, including identifying, by the machine learning model and based on the second signals, a plurality of instances of the object, the plurality of instances of the object including an instance of the object in each of a plurality of frames of the first footage; and
- generating, with the computing device or with another computing device, and based on all of the plurality of instances, a matte corresponding to the object.

26. A computer-implemented method for processing footage, comprising:
- using a machine learning model to:
  - receive first footage;
  - receive a tag identifying an object in the first footage;
  - process the first footage, including to identify, based on the tag, one or more instances of the object in the first footage; and
- generating, based on the one or more instances, a matte corresponding to the object,
- wherein to process the first footage includes, for each of the one or more instances, to determine an image depth of the object within the first footage;
- wherein the matte defines a depth for the object based on the image depth; and
- wherein the object is one of a foreground image element, a background image element, an image of a person, or an image of a vehicle.

* * * * *